US009560219B2

(12) United States Patent
Sakayama et al.

(10) Patent No.: US 9,560,219 B2
(45) Date of Patent: Jan. 31, 2017

(54) IMAGE PROCESSING APPARATUS AND IMAGE PROCESSING SYSTEM

(71) Applicant: FUJI XEROX CO., LTD., Tokyo (JP)

(72) Inventors: Takashi Sakayama, Kanagawa (JP); Yoshiharu Yoshida, Kanagawa (JP); Masakazu Yamamoto, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/539,378

(22) Filed: Nov. 12, 2014

(65) Prior Publication Data
US 2015/0381829 A1    Dec. 31, 2015

(30) Foreign Application Priority Data

Jun. 30, 2014  (JP) ................................. 2014-135336

(51) Int. Cl.
*H04N 1/00*   (2006.01)
*H04N 1/23*   (2006.01)

(52) U.S. Cl.
CPC ........ *H04N 1/00103* (2013.01); *H04N 1/2307* (2013.01)

(58) Field of Classification Search
None
See application file for complete search history.

(56) References Cited

U.S. PATENT DOCUMENTS

| 6,026,258 | A  | * | 2/2000  | Fresk ................... G03G 15/221 358/296 |
| 7,126,716 | B1 | * | 10/2006 | Kaufman ............... B41J 3/4075 358/1.18 |
| 8,749,823 | B2 | * | 6/2014  | Kato ..................... G06F 3/1222 358/1.14 |
| 9,047,029 | B2 | * | 6/2015  | Suzuki .................. G06F 3/1292 |
| 2003/0005050 | A1 | * | 1/2003  | Pineau ................... G06Q 30/02 709/203 |
| 2003/0054859 | A1 | * | 3/2003  | Goto ..................... H04B 1/3877 455/557 |
| 2004/0190049 | A1 | * | 9/2004  | Itoh ...................... G06F 3/1204 358/1.15 |
| 2004/0257605 | A1 | * | 12/2004 | Hayashi ............. H04N 1/32101 358/1.14 |
| 2005/0002058 | A1 | * | 1/2005  | Hirabayashi ....... H04N 1/00132 358/1.15 |

(Continued)

FOREIGN PATENT DOCUMENTS

| JP | H11-288402 A  | 10/1999 |
| JP | H11-328051 A  | 11/1999 |
| JP | 2000-010893 A | 1/2000  |

*Primary Examiner* — Ted Barnes
(74) *Attorney, Agent, or Firm* — Oliff PLC

(57) ABSTRACT

An image processing apparatus including a communication unit, a controller, and an image processing unit. The communication unit receives information related to a processing condition for image processing stored in and specified with a terminal device. The controller sets a state in which the information related to the processing condition is accepted with the communication unit from one terminal device, which performs wireless communication, and not from another terminal device, which performs wireless communication, other than the one terminal device. The image processing unit performs the image processing.

4 Claims, 16 Drawing Sheets

(56) References Cited

U.S. PATENT DOCUMENTS

| | | | |
|---|---|---|---|
| 2005/0010928 A1* | 1/2005 | Gunji | G06F 3/1203 719/318 |
| 2005/0018240 A1* | 1/2005 | Shima | H04N 1/00278 358/1.15 |
| 2005/0179944 A1* | 8/2005 | Gassho | G06F 3/1203 358/1.16 |
| 2007/0134040 A1* | 6/2007 | Kurata | B41J 2/17546 400/62 |
| 2007/0140722 A1* | 6/2007 | Kobayashi | G03G 15/5012 399/81 |
| 2007/0216935 A1* | 9/2007 | Osamura | G06F 3/1222 358/1.15 |
| 2008/0137138 A1* | 6/2008 | Matoba | G03G 15/5075 358/1.15 |
| 2008/0304088 A1* | 12/2008 | Tomihisa | G06F 21/608 358/1.9 |
| 2009/0036056 A1* | 2/2009 | Oshima | H04M 1/7253 455/41.3 |
| 2009/0066998 A1* | 3/2009 | Kato | G01C 21/26 358/1.15 |
| 2010/0225962 A1* | 9/2010 | Okigami | H04L 63/0492 358/1.15 |
| 2011/0222103 A1* | 9/2011 | Doui | G06F 21/608 358/1.14 |
| 2011/0242569 A1* | 10/2011 | Ohara | G06F 3/1205 358/1.13 |
| 2011/0242599 A1* | 10/2011 | Ohara | H04L 29/12113 358/1.15 |
| 2011/0292445 A1* | 12/2011 | Kato | G06F 3/1222 358/1.15 |
| 2012/0162681 A1* | 6/2012 | Tomita | G06F 3/1222 358/1.13 |
| 2012/0218599 A1* | 8/2012 | Kashioka | G06F 3/1222 358/1.15 |
| 2013/0070288 A1* | 3/2013 | Muranaka | G06F 3/1204 358/1.15 |
| 2013/0077125 A1* | 3/2013 | Kitagata | G06F 3/1204 358/1.14 |
| 2013/0114107 A1* | 5/2013 | Park | G06F 3/1247 358/1.15 |
| 2013/0260683 A1* | 10/2013 | Suzuki | H04W 4/008 455/41.1 |
| 2013/0286425 A1* | 10/2013 | Nakamura | G06F 3/1204 358/1.13 |
| 2013/0329253 A1* | 12/2013 | Sasaki | H04N 1/0035 358/1.15 |
| 2014/0085654 A1* | 3/2014 | Miyazaki | H04N 1/00209 358/1.13 |
| 2014/0118769 A1* | 5/2014 | Adachi | G06F 3/1211 358/1.13 |
| 2014/0153014 A1* | 6/2014 | Kaneda | H04N 1/00448 358/1.12 |
| 2014/0240778 A1* | 8/2014 | Itogawa | G06F 3/1292 358/1.15 |
| 2014/0253965 A1* | 9/2014 | Asai | G06F 3/1205 358/1.15 |
| 2014/0285826 A1* | 9/2014 | Sato | G06F 3/1292 358/1.6 |
| 2014/0327936 A1* | 11/2014 | Busch | G06F 3/1292 358/1.15 |
| 2014/0342665 A1* | 11/2014 | Amano | H04W 52/0229 455/41.1 |
| 2014/0366101 A1* | 12/2014 | Murata | H04N 1/00127 726/4 |
| 2014/0368859 A1* | 12/2014 | Gutnik | G06F 3/1206 358/1.14 |
| 2014/0376049 A1* | 12/2014 | Von Stein | G06F 3/1292 358/1.15 |
| 2015/0002884 A1* | 1/2015 | Okumura | G06F 3/1203 358/1.14 |
| 2015/0002891 A1* | 1/2015 | Kadota | G06F 3/1292 358/1.15 |
| 2015/0036170 A1* | 2/2015 | Miyake | G06F 3/1238 358/1.14 |
| 2015/0036185 A1* | 2/2015 | Asai | H04N 1/00973 358/1.15 |
| 2015/0036188 A1* | 2/2015 | Miyake | G06F 3/1288 358/1.15 |
| 2015/0036191 A1* | 2/2015 | Suzuki | G06F 3/1292 358/1.15 |
| 2015/0062633 A1* | 3/2015 | Asai | G06F 3/1236 358/1.15 |

* cited by examiner

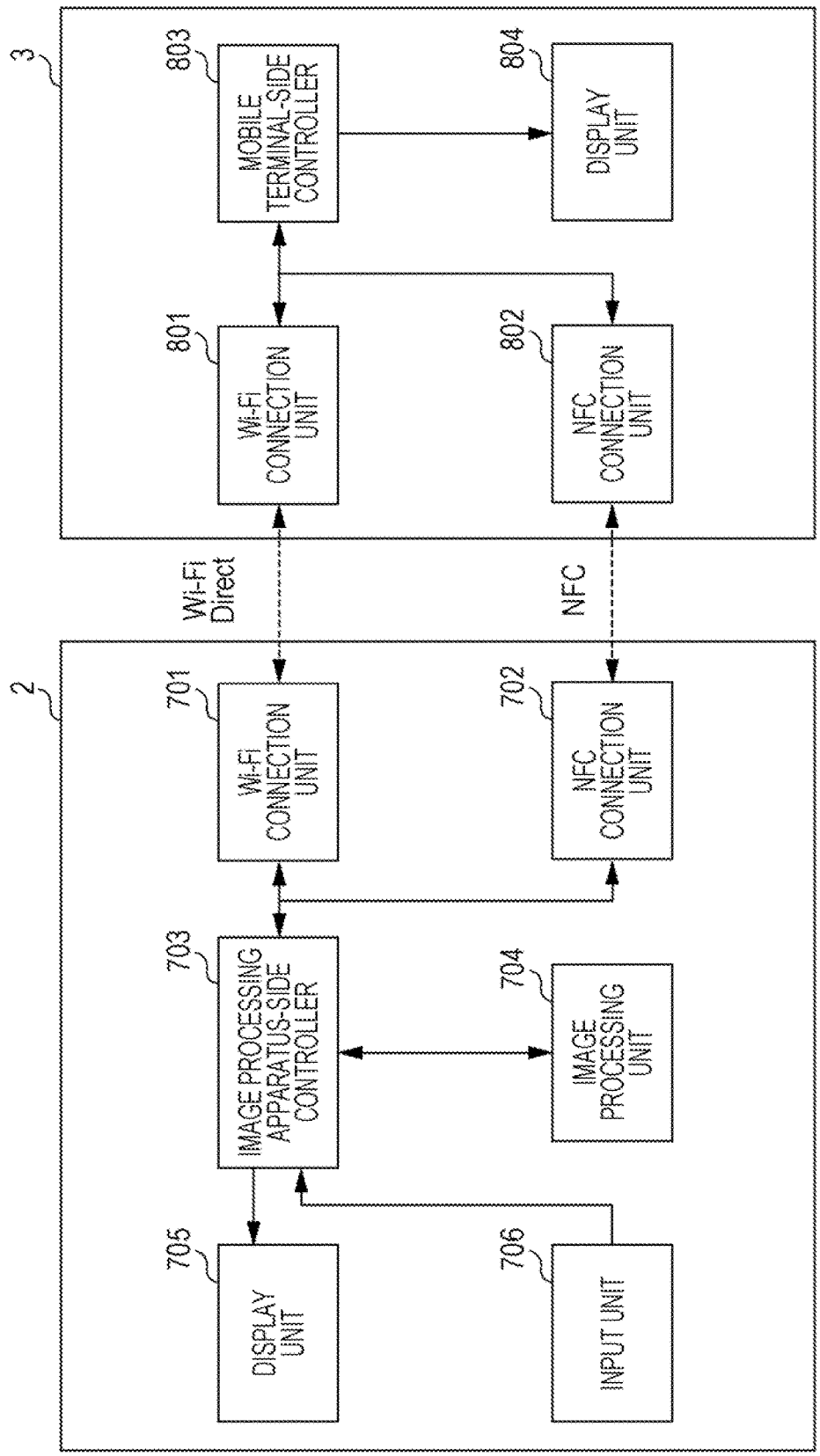

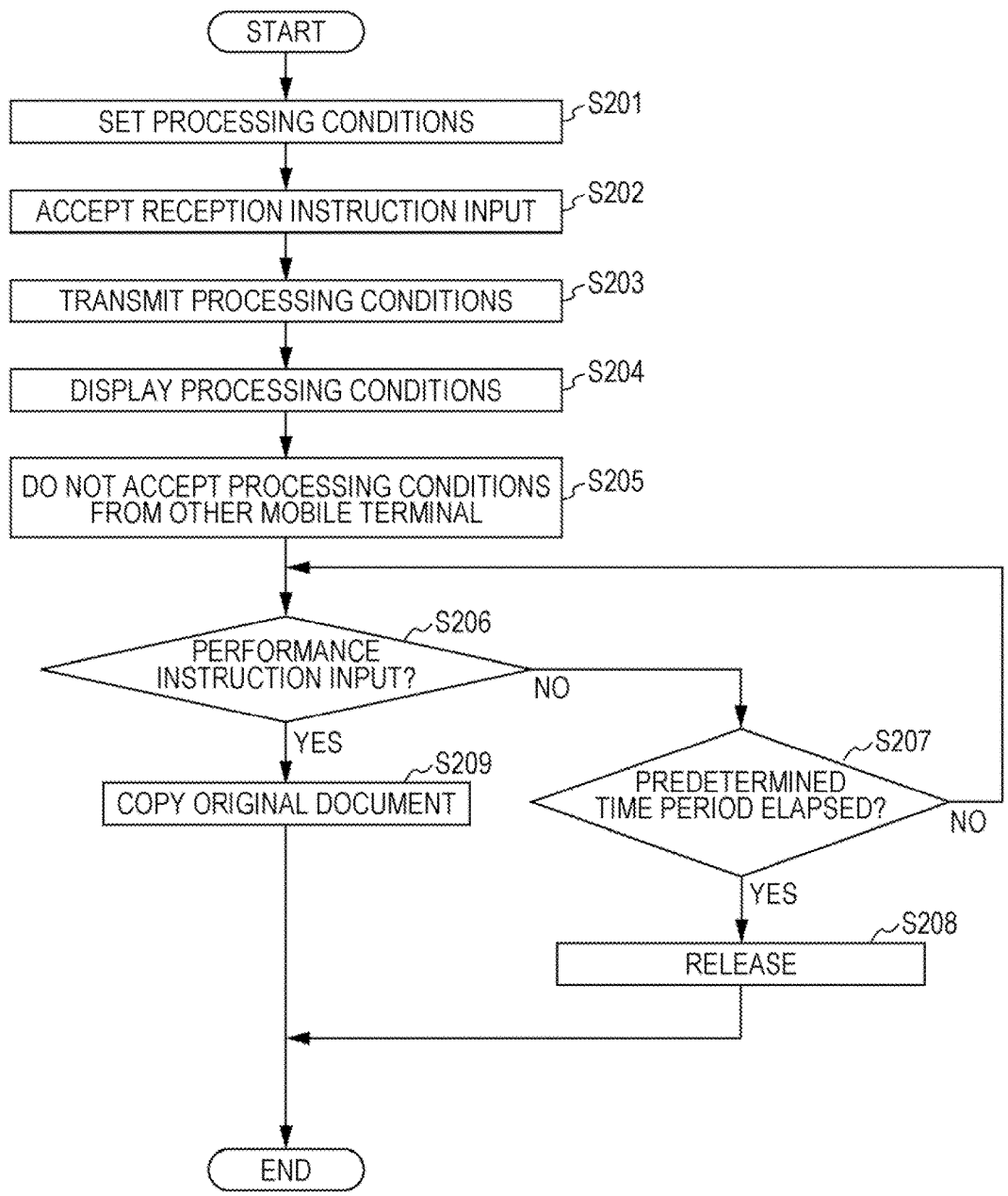

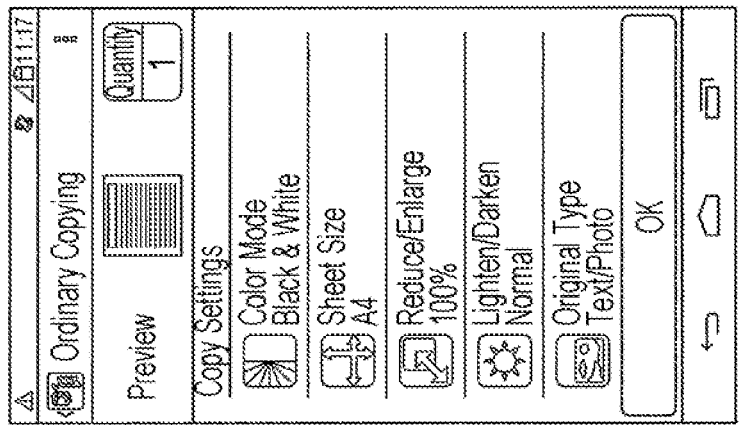
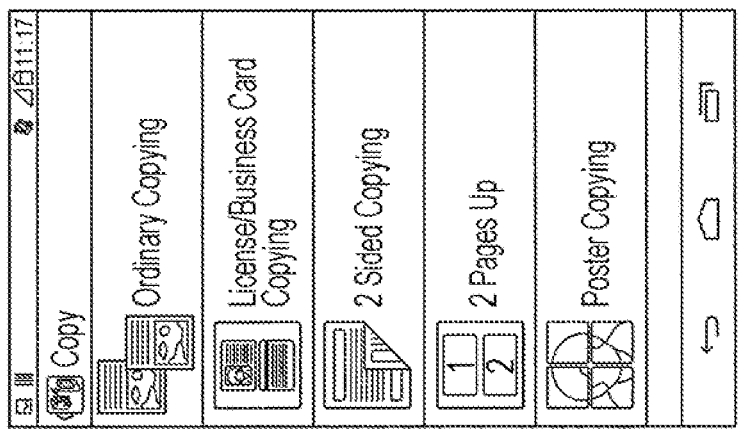

IMAGE PROCESSING APPARATUS AND IMAGE PROCESSING SYSTEM

CROSS-REFERENCE TO RELATED APPLICATIONS

This application is based on and claims priority under 35 USC 119 from Japanese Patent Application No. 2014-135336 filed Jun. 30, 2014.

BACKGROUND

Technical Field

The present invention relates to an image processing apparatus and an image processing system.

SUMMARY

An image processing apparatus according to an aspect of the present invention includes a communication unit, a controller, and an image processing unit. The communication unit receives information related to a processing condition for image processing stored in and specified with a terminal device. The controller sets a state in which the information related to the processing condition is accepted with the communication unit from one terminal device, which performs wireless communication, and not from another terminal device, which performs wireless communication, other than the one terminal device. The image processing unit performs the image processing.

BRIEF DESCRIPTION OF THE DRAWINGS

Exemplary embodiments of the present invention will be described in detail based on the following figures, wherein:

FIG. 5 is a block diagram illustrating an example of a functional configuration of the image processing apparatus and the mobile terminal;

FIG. 9 is a flowchart illustrating operations of the image processing apparatus and the mobile terminal according to a second exemplary embodiment;

FIGS. 10A to 10F illustrate examples of screens displayed in the liquid crystal panel of the mobile terminal during the operations illustrated in FIG. 9;

DETAILED DESCRIPTION

Exemplary embodiments of the present invention will be described in detail below with reference to the attached drawings.

Description of General Configuration of Image Processing System 1

Initially, a general configuration of an image processing system 1 according to the present exemplary embodiments is described.

Figure 1:
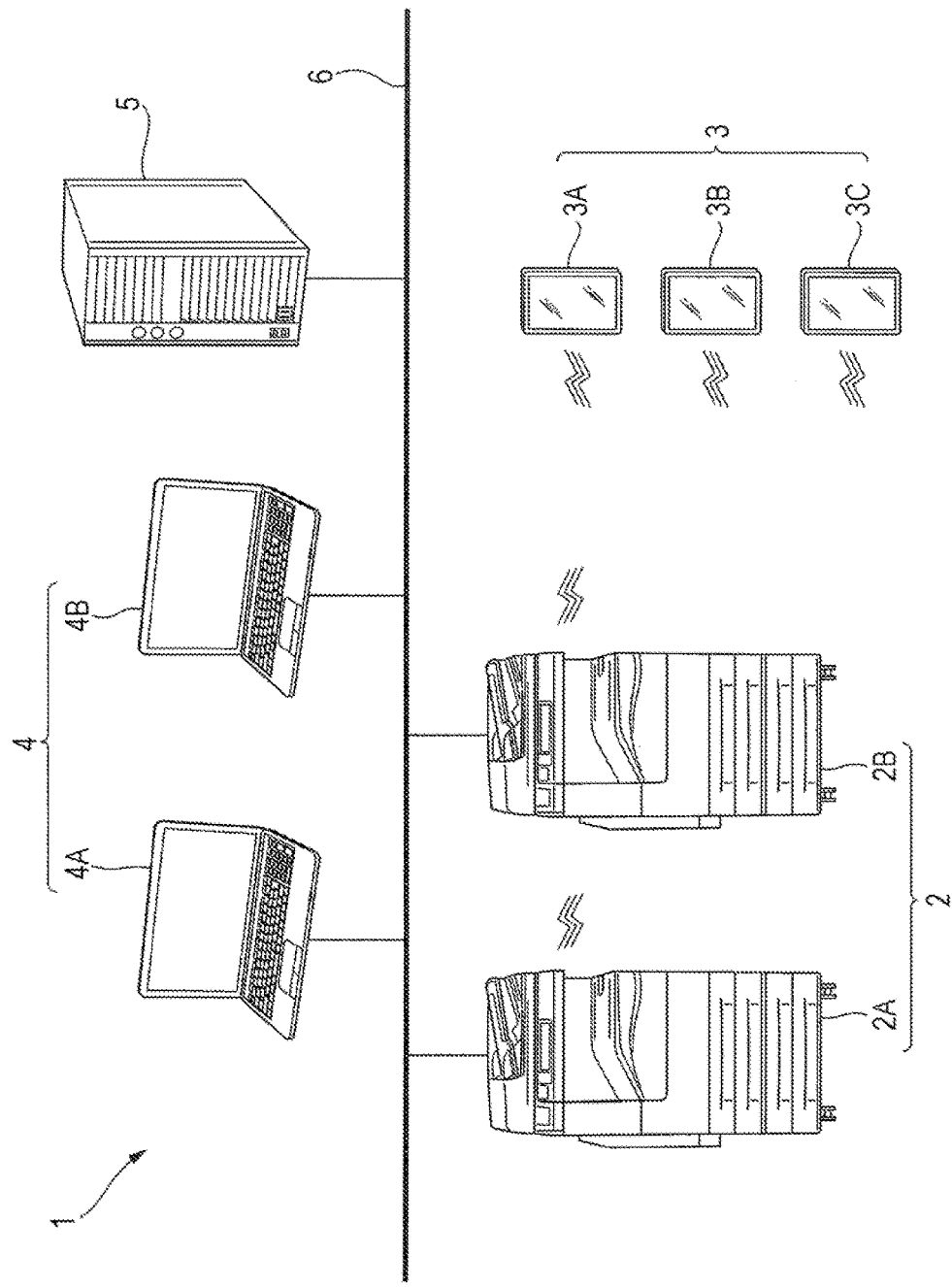
FIG. 1 illustrates an example of a general configuration of an image processing system according to present exemplary embodiments.

FIG. 1 illustrates an example of the general configuration of the image processing system 1 according to the present exemplary embodiments.

As illustrated in FIG. 1, the image processing system 1 includes image processing apparatuses 2A and 2B, mobile terminals 3A to 3C, operation terminals 4A and 4B, and an administrative server 5. Wireless communication is performed between the image processing apparatuses 2A and 2B and the mobile terminal 3A, 3B, and 3C. Furthermore, the image processing apparatuses 2A and 2B, the operation terminals 4A and 4B, and the administrative server 5 are connected to a network 6 so as to allow these apparatuses or devices to communicate with one another.

Although the image processing apparatuses 2A and 2B are illustrated in FIG. 1, these are referred to as the image processing apparatus 2 or the image processing apparatuses 2 in the case where distinction between these is not required. Likewise, although the mobile terminals 3A to 3C are illustrated in FIG. 1, these are referred to as the mobile terminal 3 or the mobile terminals 3 in the case where distinction between these is not required. Likewise, although the operation terminals 4A and 4B are illustrated in FIG. 1, these are referred to as the operation terminal 4 or the operation terminals 4 in the case where distinction between these is not required. Although two image processing apparatuses 2 are illustrated in the example in FIG. 1, three or more image processing apparatuses 2 may be provided. Although three mobile terminals 3 are illustrated in the example illustrated in FIG. 1, four or more mobile terminals 3 may be provided. Although two operation terminals 4 are illustrated in the example illustrated in FIG. 1, three or more operation terminals 4 may be provided.

The image processing apparatuses 2 perform image processing, have the functions of, for example, scanning, printing, copying, facsimileing, and so forth, and output images by forming the images on recording media such as sheets of paper. Here, the image processing apparatuses 2 receive printing jobs from the mobile terminals 3, operation terminals 4, and so forth, and perform printing processes in accordance with the received printing jobs. The printing job is data that serves as a unit of a printing process performed by the image processing apparatuses 2. The printing job includes image data of a printing object and a control instruction, in which settings in the printing process are described.

The mobile terminals 3 are portable computing devices and serve as an example of terminal devices. Processing conditions for image processing performed by the image processing apparatuses 2 are created with the mobile terminals 3 and transmitted from the mobile terminals 3 to the image processing apparatuses 2. The mobile terminals 3 use, for example, smart phones, tablet personal computers (PCs), notebook PCs, and the like.

The operation terminals 4 are computing devices used when the user performs an operation such as reading or editing on a document file. The operation terminals 4 use, for example, notebook PCs, desktop PCs, and the like. Also, the operation terminals 4 may use portable computing devices such as smart phones.

The administrative server 5 is a computing device that stores various data processed by the image processing system 1.

The network 6 is a communication apparatus used for inter-device information communication among the image processing apparatuses 2, the operation terminals 4, and the administrative server 5. Examples of the network 6 include a local area network (LAN).

In the present exemplary embodiments, wireless communication is performed by using a short range wireless communication (for example, near field communication (NFC)) and a communication standard different from and faster than the short range wireless communication (for example, wireless fidelity (Wi-Fi) Direct) between the image processing apparatuses 2 and the mobile terminals 3. The NFC refers to a wireless communication standard with which the communication range is limited to about 10 cm. The Wi-Fi Direct refers to a standard by which Wi-Fi capable terminals are directly communicated with one another, and each Wi-Fi capable device has a function of operating as an access point. The access point refers to a relay device that wirelessly relays communication between devices. Generally described, any one of plural Wi-Fi capable devices participating in a Wi-Fi Direct network actually operates as the access point, thereby direct communication is performed between the device operating as the access point and the other Wi-Fi capable devices.

Also with the Wi-Fi Direct, communication devices participating in a certain network are defined as peer-to-peer (P2P) devices and this network is defined as a P2P group. In a P2P group, a P2P device actually operating as the access point is defined as a P2P group owner, and P2P devices other than the P2P group owner are defined as P2P device clients. Each of the P2P devices detects P2P devices that may be connected to the Wi-Fi Direct network by transmitting/receiving signals to/from other P2P devices, and the P2P group owner is selected from among the plural P2P devices.

In the present exemplary embodiments, the image processing apparatuses 2 function as the P2P group owners. Also with the Wi-Fi Direct, typically, an upper limit of the number of P2P device clients simultaneously connected to a P2P group owner is determined. In the present exemplary embodiments, the upper limit of the number of mobile terminals 3 simultaneously connected to one of the image processing apparatuses 2 via the Wi-Fi Direct connection is, for example, three.

In the above-described image processing system 1, the user may transmit printing jobs from the mobile terminals 3 or the operation terminals 4 to the image processing apparatuses 2 via the network 6 or via the Wi-Fi Direct wireless communication to perform printing with the image processing apparatuses 2.

Alternatively, the user may go to a location where the image processing apparatuses 2 is installed to scan (read images of) or copy an original document. An image having been read may be transmitted by facsimile through the network 6 or a public telecommunication network (not illustrated).

The administrative server 5 may manage printing jobs to be performed by the image processing apparatuses 2, appropriately reorder the printing jobs, and transmit the printing jobs to the image processing apparatuses 2. In this case, the administrative server 5 functions as a print server. The administrative server 5 may manage files so as to share the files among the mobile terminals 3 and the operation terminals 4. In this case, the administrative server 5 functions as a file server.

Description of Image Processing Apparatus 2

Figure 2:
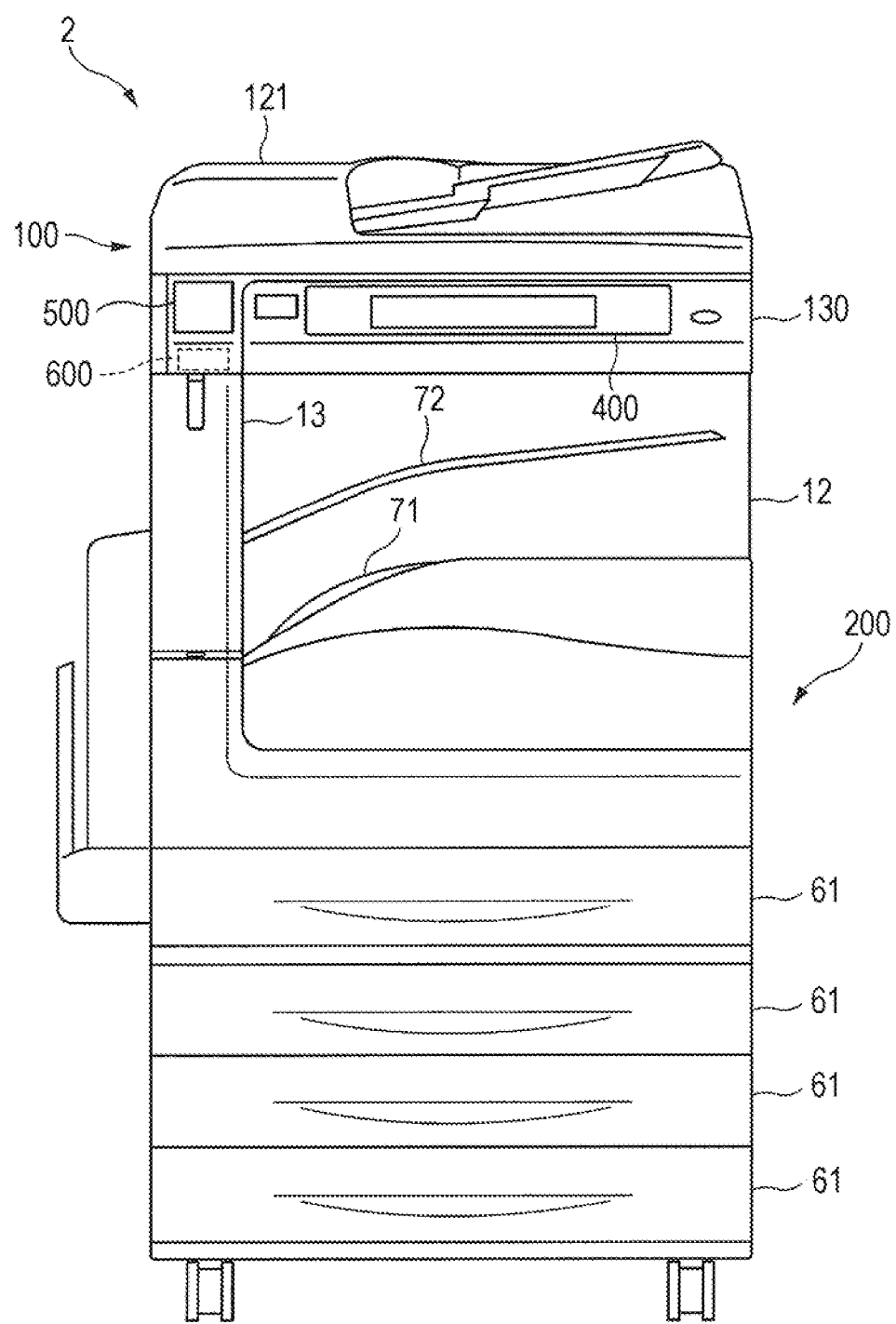
FIG. 2 illustrates the appearance of an image processing apparatus according to the present exemplary embodiments.
Figure 3:
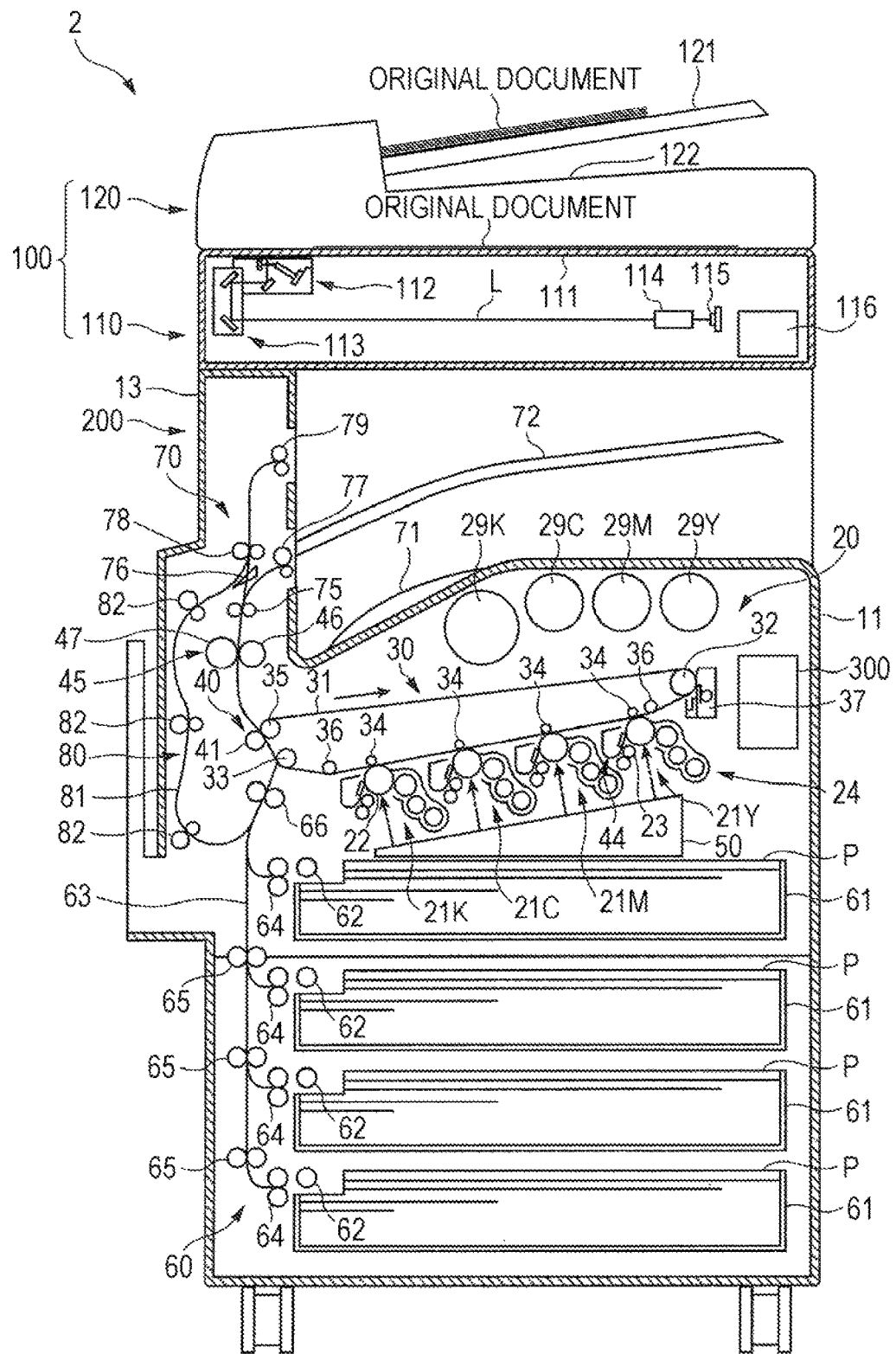
FIG. 3 illustrates the interior of the image processing apparatus according to the present exemplary embodiments.

FIG. 2 illustrates the appearance of the image processing apparatus 2 according to the present exemplary embodiments. FIG. 3 illustrates the interior of the image processing apparatus 2 according to the present exemplary embodiments.

The image processing apparatus 2 includes an image reading device 100 and an image forming device 200. The image reading device 100 reads an image of an original document. The image forming device 200 forms an image on a recording medium (sheet of paper). The image processing apparatuses 2 also includes a controller 300 and a user interface (UI) 400. The controller 300 controls operations of the entire apparatus. The UI 400 outputs instructions received from the user to the controller 300 and notifies the user of information received from the controller 300. Furthermore, the image processing apparatuses 2 includes a wireless interface (referred to as wireless I/F hereafter) 500 and an NFC interface (referred to as NFC I/F hereafter) 600. The wireless I/F 500 performs wireless communication with the mobile terminals 3 via the Wi-Fi Direct connection. The NFC I/F 600 performs NFC communication with the mobile terminals 3.

The image reading device 100 is disposed in an upper portion of the image processing apparatus 2. The image forming device 200 is disposed below the image reading device 100. The controller 300 is disposed in the image forming device 200. The UI 400 is disposed in an upper central portion on the front side of the image processing apparatus 2, that is, on the front side of a central portion of an image reading unit 110, which will be described later, of the image reading device 100. Furthermore, the wireless I/F 500 is disposed at a left end on the front side of an upper portion of the image processing apparatus 2, and the NFC I/F 600 is disposed in the upper portion of the image processing apparatus 2.

The image reading device 100 is initially described.

The image reading device 100 includes the image reading unit 110 and a document transport device 120. The image reading unit 110 reads an image of an original document. The document transport device 120 transports the original document to the image reading unit 110. The document transport device 120 is disposed in an upper portion of the image reading device 100. The image reading unit 110 is disposed in a lower portion of the image reading device 100.

The document transport device 120 includes a document loader 121 and a document output unit 122. The original document is loaded in the document loader 121. The original document transported from the document loader 121 is ejected to the document output unit 122. The document transport device 120 transports the original document from the document loader 121 to the document output unit 122. The document transport device 120 is also referred to as an auto document feeder (ADF).

The image reading unit 110 includes a platen glass 111, a radiation unit 112, a light guide unit 113, and an imaging lens 114. The radiation unit 112 radiates light to an original document surface to be read (image surface). The light guide unit 113 guides light L, which has been radiated from the radiation unit 112 to the original document surface to be read and reflected by the original document surface to be read.

The imaging lens 114 forms an optical image of the light L guided by the light guide unit 113. The image reading unit 110 also includes a detector 115 and a signal processing unit 116. The detector 115 includes a photoelectric transducer such as a charge coupled device (CCD) image sensor that performs photoelectric conversion on the light L, the image of which is formed by the imaging lens 114, and detects the formed optical image. The signal processing unit 116 is electrically connected to the detector 115. An electrical signal obtained by the detector 115 is transmitted to the signal processing unit 116.

The image reading unit 110 reads an image of the original document transported by the document transport device 120 and an image of the original document placed on the platen glass 111.

Next, the image forming device 200 is described.

The image forming device 200 includes an image forming section 20, a sheet supply section 60, a sheet ejection unit 70, and an inversion and transport unit 80. The image forming section 20 forms an image on a sheet of paper. The sheet supply section 60 supply a sheet of paper, which is denoted by P, to the image forming section 20. The sheet ejection unit 70 ejects the sheet P, on which an image has been formed by the image forming section 20. The inversion and transport unit 80 inverts the sheet P, on one side of which an image has been formed by the image forming section 20, and transports the sheet P again to the image forming section 20.

The image forming section 20 includes four image forming units 21Y, 21M, 21C, and 21K for yellow (Y), magenta (M), cyan (C), and black (K). The equally spaced image forming units 21 are arranged substantially parallel to one another. Each of the image forming units 21 includes a photoconductor drum 22, a charger 23, and a developing device 24. The charger 23 uniformly charges the surface of the photoconductor drum 22. The developing device 24 develops an electrostatic latent image, which has been formed by laser radiation, with toner of a predetermined color component for visualization. The laser radiation is performed by an optical unit 50, which will be described later. The image forming section 20 also includes toner cartridges 29Y, 29M, 29C, and 29K that each supply the toner of a corresponding one of the colors to the developing device 24 of a corresponding one of the image forming units 21Y, 21M, 21C, and 21K.

The image forming section 20 includes the optical unit 50 disposed below the image forming units 21Y, 21M, 21C, and 21K. The optical unit 50 radiates laser light to the photoconductor drums 22 of the image forming units 21Y, 21M, 21C, and 21K. The optical unit 50 includes the following components, which are not illustrated: a semiconductor laser; a modulator; a polygon mirror that deflects and scans the laser light emitted from the semiconductor laser; a glass window that allows the laser light to pass therethrough; and a frame that encloses the components.

The image forming section 20 also includes an intermediate transfer unit 30, a second transfer unit 40, and a fixing device 45. The intermediate transfer unit 30 performs multi-transfer, by which the toner images of the colors formed on the photoconductor drums 22 of the image forming units 21Y, 21M, 21C, and 21K are transferred onto an intermediate transfer belt 31. The second transfer unit 40 transfers the toner images superposed on the intermediate transfer unit 30 onto the sheet P. The fixing device 45 fixes the toner images formed on the sheet P by heating and applying pressure to the toner images.

The intermediate transfer unit 30 includes the intermediate transfer belt 31, a drive roller 32, and a tension roller 33. The drive roller 32 drives the intermediate transfer belt 31. The tension roller 33 applies constant tension to the intermediate transfer belt 31. The intermediate transfer unit 30 also includes plural (four in the present exemplary embodiments) first transfer rollers 34 and a backup roller 35. The first transfer rollers 34 oppose the respective photoconductor drums 22 with the intermediate transfer belt 31 pinched therebetween and are used to transfer the toner images formed on the photoconductor drums 22 onto the intermediate transfer belt 31. The backup roller 35 opposes a second transfer roller 41, which will be described later, through the intermediate transfer belt 31.

The intermediate transfer belt 31 is looped over plural rotating members such as the drive roller 32, the tension roller 33, the plural first transfer rollers 34, the backup roller 35, and driven rollers 36. The intermediate transfer belt 31 is driven in a circulating path at a predetermined speed in an arrow direction by the drive roller 32, which is rotated by a drive motor (not illustrated). The intermediate transfer belt 31 is formed by, for example, molding rubber or resin.

The intermediate transfer unit 30 also includes a cleaner 37 that removes residual toner and the like from the intermediate transfer belt 31. The cleaner 37 removes the residual toner, paper dust, and the like from the surface of the intermediate transfer belt 31 after the toner images have been transferred.

The second transfer unit 40 includes the second transfer roller 41 disposed at a second transfer position. The second transfer roller 41 is pressed against the backup roller 35 through the intermediate transfer belt 31, so that the images are transferred onto the sheet P through second transfer. The second transfer position is formed by the second transfer roller 41 and the backup roller 35, which opposes the second transfer roller 41 through the intermediate transfer belt 31. The toner images having been transferred onto the intermediate transfer belt 31 are transferred onto the sheet P at the second transfer position.

The fixing device 45 fixes the images (toner images), which have been transferred onto the sheet P through the second transfer by the intermediate transfer unit 30, onto the sheet P by heat and pressure applied with a heating fixing roller 46 and a pressure roller 47.

The sheet supply section 60 includes sheet containing units 61, feed rollers 62, a transport path 63, and transport rollers 64, 65, and 66. The sheet containing units 61 contain the sheets P, on which images are formed. The feed rollers 62 feed the sheets P contained in the sheet containing units 61. The sheets P fed by the feed rollers 62 are transported through the transport path 63. The sheets P fed by the feed rollers 62 are transported to the second transfer position by the transport rollers 64, 65, and 66 disposed along the transport path 63.

The sheet ejection unit 70 includes a first stacking tray 71 provided above the image forming section 20 and a second stacking tray 72 provided between the first stacking tray 71 and the image reading device 100. The sheet P, on which an image has been formed by the image forming section 20, is placed on the first stacking tray 71. The sheet P, on which the image has been formed by the image forming section 20, is placed on the second stacking tray 72.

The sheet ejection unit 70 also includes a transport roller 75 on the downstream of the fixing device 45 in a transport direction and a switching gate 76 provided on the downstream of the transport roller 75 in the transport direction. The transport roller 75 transports the sheet P onto which the toner images have been fixed. The switching gate 76 switches the transport direction of the sheet P. The sheet ejection unit 70 also includes a first ejection roller 77 on the downstream of the switching gate 76 in the transport direction. The first ejection roller 77 ejects the sheet P transported to one side (right side in FIG. 3) in the transport direction, to which the switching gate 76 is switched, to the first stacking tray 71. The sheet ejection unit 70 also includes a transport roller 78 and a second ejection roller 79 on the downstream of the switching gate 76 in the transport direction. The transport roller 78 transports the sheet P transported to another side (upper side in FIG. 3) in the transport direction, to which the switching gate 76 is switched. The sheet P transported by the transport roller 78 is ejected to the second stacking tray 72 by the second ejection roller 79.

The inversion and transport unit 80 has an inversion and transport path 81 beside the fixing device 45. The sheet P is inverted and transported through the inversion and transport path 81 by rotating the transport roller 78 in a direction opposite to a direction in which the sheet P is ejected to the second stacking tray 72. Plural transport rollers 82 are provided along this inversion and transport path 81. The sheet P transported by these transport rollers 82 are fed to the second transfer position again by the transport rollers 82.

The image forming device 200 includes a device frame 11 and a device housing 12. The device frame 11 directly or indirectly supports the image forming section 20, the sheet supply section 60, the sheet ejection unit 70, the inversion and transport unit 80, and the controller 300. The device housing 12 is mounted on the device frame 11 to serve as an exterior of the image processing apparatus 2.

The device frame 11 includes a reading device support portion 13, in which the components such as the switching gate 76, the first ejection roller 77, the transport roller 78, and the second ejection roller 79 are disposed. The reading device support portion 13 extends in the up-down direction and supports the image reading device 100 on a lateral end side of the image processing apparatus 2. The reading device support portion 13 cooperates with a rear portion of the device frame 11 to support the image reading device 100.

Other than controlling of operations of the entire image processing apparatus 2, the controller 300 performs image processing such as color correction and scale correction on image data input thereto, and generates image data having undergone the image processing.

The controller 300 actually uses a computing device that includes a central processing unit (CPU), a random access memory (RAM), a read only memory (ROM), and so forth. That is, the CPU executes a variety of software such as an operating system (OS) and application programs. The RAM is used as, for example, a work memory for the CPU. The ROM stores various programs to be executed by the CPU. The CPU loads the programs stored in the ROM or the like to the RAM and executes the loaded programs so as to implement the functions of the image processing apparatus 2. The controller 300 may include a magnetic disk device, which stores image data and so forth used in image forming operations, such as a hard disk drive (HDD).

The UI 400 uses a touch panel in which various information is displayed and with which operational input by the user is received. Here, the UI 400 includes a display and a position detection sheet. The display displays various information. The position detection sheet detects a position touched by a finger, a stylus, or the like. A device that detects a touched position may use any device such as a device that performs detection in accordance with a pressure applied when the device is touched, a device that performs detection in accordance with static electricity of a touched object. An input device such as a display and a keyboard may be used instead of the touch panel.

The wireless I/F 500 includes an antenna for wireless communication with the mobile terminals 3 via the Wi-Fi Direct connection. The wireless I/F 500 functions as a communication interface through which various data is transmitted to and received from the mobile terminals 3.

The NFC I/F 600 includes an antenna for the NFC communication with the mobile terminals 3. The NFC I/F 600 functions as a communication interface through which various data is transmitted to and received from the mobile terminals 3.

The image processing apparatus 2 having a configuration as described above operates as follows.

For example, when copying or printing is performed by the image forming device 200, the image forming device 200 operates as follows.

The controller 300 performs predetermined image processing on image data of an original document for copying read by the image reading device 100 and image data for printing received from the mobile terminals 3, the operation terminals 4, or the administrative server 5. The image data, on which the image processing has been performed, is converted into color gradation data of four colors, which are yellow (Y), magenta (M), cyan (C), and black (K), and is output to the optical unit 50.

In the optical unit 50, the laser light emitted from the semiconductor laser (not illustrated) in accordance with the received color gradation data is directed to the polygon mirror through an f-θ lens (not illustrated). In the polygon mirror, the laser light incident thereupon is modulated in accordance with the gradation data of the colors, deflected and scanned, and radiated to the photoconductor drums 22 of the image forming units 21Y, 21M, 21C, and 21K through an imaging lens (not illustrated) and plural mirrors (not illustrated).

Electrostatic latent images are formed on the photoconductor drums 22 of the image forming units 21Y, 21M, 21C, and 21K when the surfaces of the photoconductor drums 22, which have been charged by the charger 23, are exposed to and scanned by the laser light. The formed electrostatic latent images are developed into toner images of yellow (Y), magenta (M), cyan (C), and black (K) in the respective image forming units 21Y, 21M, 21C, and 21K. The toner images formed on the photoconductor drums 22 of the image forming units 21Y, 21M, 21C, and 21K are transferred onto the intermediate transfer belt 31 serving as an intermediate transfer body through multi-transfer.

In the sheet supply section 60, the feed roller 62 is rotated at timing adjusted to image formation, thereby picking up the sheet P contained in one of the sheet containing units 61 and transporting the sheet P through the transport path 63 with the transport rollers 64 and 65. After that, the transport roller 66 is rotated at timing adjusted to a movement of the intermediate transfer belt 31, on which the toner images have been formed, thereby transporting the sheet P to the second transfer position formed by the backup roller 35 and the second transfer roller 41. At the second transfer position, the toner images of four colors superposed with one another are gradually transferred in a sub-scanning direction onto the sheet P being upwardly transported with a contact pressure and a predetermined electric field. The sheet P, onto which the toner images of the colors have been transferred, is subjected to a fixing process, in which heat and pressure are applied, in the fixing device 45, ejected from the fixing device 45, and placed on the first stacking tray 71 or the second stacking tray 72.

When duplex printing is requested, the sheet P, on one side of which the image has been formed, is transported into the inversion and transport unit 80 so as to be inverted and fed to the second transfer position again. Toner images are transferred onto another side of the sheet P at the second transfer position, and the transferred images are fixed to the sheet P by the fixing device 45. After that, the sheet P, on both sides of which the images have been formed, is ejected and placed on the first stacking tray 71 or the second stacking tray 72.

Image data of an original document read by the image reading device 100 may be stored in the controller 300 without being printed by the image forming device 200. Also, the image data may be transmitted to the mobile terminals 3, the operation terminals 4, or the administrative server 5 via the network 6 or the Wi-Fi Direct connection. Also, the image data may be transmitted from the controller 300 to an external device by facsimile.

Description of Mobile Terminal 3

As described above, the mobile terminals 3 are the portable computing devices and each include the CPU, the RAM, the ROM, and so forth. The CPU loads the various programs stored in the ROM and the like to the RAM so as to execute the OS and various software. In the case of the mobile terminal 3, such various software may be referred to as apps.

The mobile terminal 3 may include a storage device such as, for example, an HDD or a flash memory. The HDD or the flash memory stores input data to the various software, output data from the various software, and the like. The mobile terminal 3 may also include an input device such as a keyboard or a mouse.

In the present exemplary embodiments, the mobile terminal 3 further includes components described below.

Figure 4A:
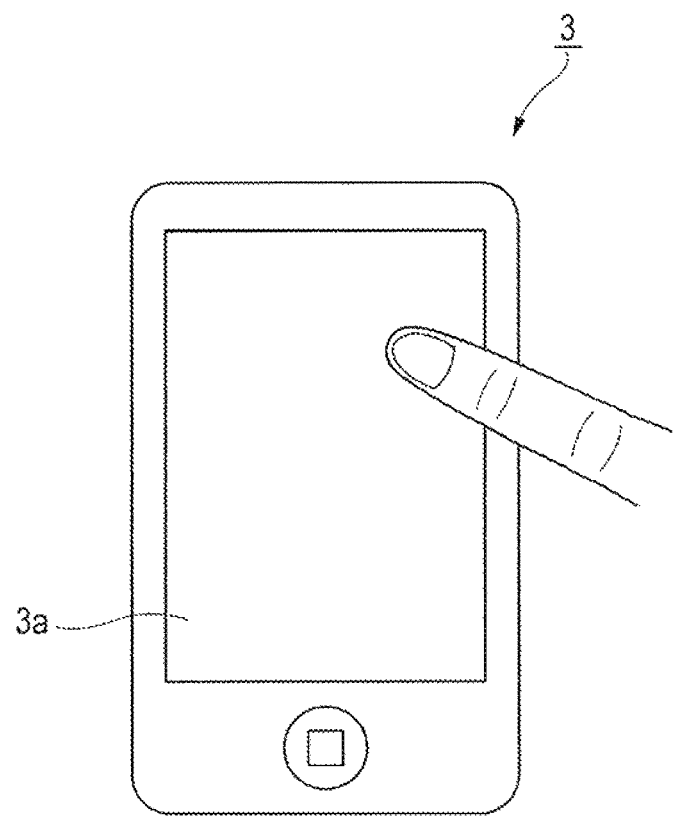
FIGS. 4A and 4B illustrate the appearance of a mobile terminal according to the present exemplary embodiments.
Figure 4B:
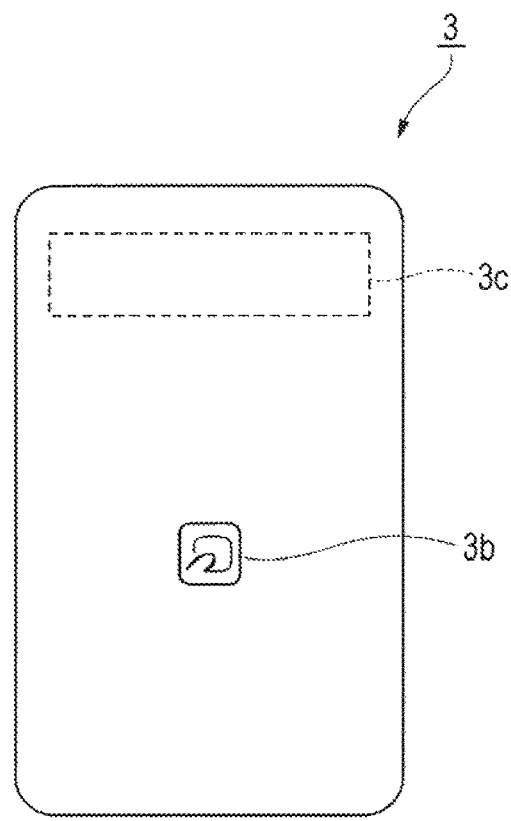

FIGS. 4A and 4B illustrate the appearance of the mobile terminal 3 according to the present exemplary embodiments.

Specifically, FIG. 4A illustrates the mobile terminal 3 seen from a side on which the user usually operates the mobile terminal 3, and FIG. 4B illustrates the mobile terminal 3 seen from a rear side when the side illustrated in FIG. 4A is the front side.

Here, the illustrated mobile terminal 3 is a so-called smart phone. A touch panel is adopted as an image display device. Thus, the mobile terminal 3 includes a liquid crystal panel 3a and a position detection unit (not illustrated). The liquid crystal panel 3a displays information such as contents as an image in a predetermined region as illustrated in FIG. 4A. When the liquid crystal panel 3a is touched by a touching object such as a human finger or a stylus, the position detection unit detects the position in the liquid crystal panel 3a touched by the touching object. In the present exemplary embodiments, the touch panel used as the liquid crystal panel 3a is not particularly limited. The touch panel may be any of a variety of touch panels such as a resistive film touch panel and an electrostatic capacitance touch panel.

As illustrated in FIG. 4B, the mobile terminal 3 includes a wireless I/F F3b and an NFC I/F F3c. The wireless I/F 3b and the NFC I/F F3c have the structures and the functions similar to those of the wireless I/F 500 and the NFC I/F 600 of the above-described image processing apparatus 2, respectively. In order for the user to perform the NFC communication between the mobile terminal 3 and the image processing apparatus 2, the mobile terminal 3 is held over the NFC I/F 600 of the image processing apparatus 2 or the NFC I/F 600 of the image processing apparatus 2 is touched by the mobile terminal 3. Thus, the NFC communication is automatically performed between the NFC I/F F3c of the mobile terminal 3 and the NFC I/F 600 of the image processing apparatus 2.

With the image processing system 1 having the above-described configuration, when the user wishes to, for example, copy the original document, the user initially goes to a location where the image processing apparatus 2 is installed. Then, the user in front of the image processing apparatus 2 operates the UI 400 to set the processing conditions (for example, parameters such as the resolution, the sheet size, and the enlargement/reduction ratio), under which the original document is copied, and press a start button (not illustrated) to copy the document. Thus, in the case where another user is using the image processing apparatus 2, even when the user who wishes to copy the original document goes to the installation location of the image processing apparatus 2, the user waits without performing any operation until the other user ends his or her operation.

As the mobile terminal 3 has been sophisticated, a function has been proposed to reduce the occurrence of such a problem. With this feature, the processing conditions for copying are preset with the mobile terminal 3, and the processing conditions are transmitted from the mobile terminal 3 to the image processing apparatus 2 when the image processing apparatus 2 is ready for the copying, thereby allowing the copying to be immediately started.

However, there may be a case where, after the processing conditions set in the mobile terminal 3 have been transmitted to the image processing apparatus 2, different processing conditions are transmitted from the other mobile terminal 3 to the image processing apparatus 2. In this case, the former processing conditions may be changed. This situation is likely to occur, for example, when one user transmits the processing conditions from the mobile terminal 3 to the image processing apparatus 2 and then leaves the proximity of the image processing apparatus 2 for exchanging the sheets or other purposes. That is, in this case, another user may transmit different processing conditions from the other mobile terminal 3 to the image processing apparatus 2 while the one user is not present in front of the image processing apparatus 2. In this case, when the one user returns to the image processing apparatus 2, the processing conditions, which are different from those originally set by the one user, have been set in the image processing apparatus 2. Thus, an image may be processed under the different processing conditions. This is inconvenient for the user.

In the present exemplary embodiments, the occurrence of such a problem is reduced by inhibiting a change in the processing conditions after the processing conditions, which are set by the user with the mobile terminal 3, have transmitted to the image processing apparatus 2.

The configuration of the image processing apparatus 2 that implements this feature will be described.

Description of Functional Configuration of Image Processing Apparatus 2 and Mobile Terminal 3

FIG. 5 is a block diagram illustrating an example of a functional configuration of the image processing apparatus 2 and the mobile terminal 3.

As illustrated in FIG. 5, the image processing apparatus 2 includes a Wi-Fi connection unit 701, an NFC connection unit 702, an image processing apparatus-side controller 703, an image processing unit 704, a display unit 705, and an input unit 706. The mobile terminal 3 includes a Wi-Fi connection unit 801, an NFC connection unit 802, a mobile terminal-side controller 803, and a display unit 804. Here, out of the various functions of the image processing apparatus 2 and the mobile terminal 3, the functions related to the present exemplary embodiments are selected and illustrated in FIG. 5.

The Wi-Fi connection unit 701 is a functional unit that performs wireless communication via the Wi-Fi Direct connection on the image processing apparatus 2 side. The Wi-Fi connection unit 701 corresponds to the wireless I/F 500 illustrated in FIG. 2.

The NFC connection unit 702 is a functional unit that performs wireless communication via the NFC connection on the image processing apparatus 2 side. The NFC connection unit 702 corresponds to the NFC I/F 600 illustrated in FIG. 2. The NFC connection unit 702 functions as an example of a communication unit that performs reception of information related to the processing conditions for image processing stored in and specified with the mobile terminal 3 via wireless communication.

The image processing apparatus-side controller 703 is an example of a controller that sets the following state: that is, the information related to the processing conditions is accepted with the NFC connection unit 702 from one mobile terminal 3, which performs wireless communication, and is not accepted from the other mobile terminals 3, which perform wireless communication, other than the one mobile terminal 3. In this case, the one mobile terminal 3 is the mobile terminal 3 of this user who transmits the processing conditions in front of the image processing apparatus 2 via the NFC connection and the other mobile terminals 3 are the mobile terminals 3 of the users other than this user. The image processing apparatus-side controller 703 also controls the Wi-Fi connection unit 701, the NFC connection unit 702, the image processing unit 704, the display unit 705, and the input unit 706. The image processing apparatus-side controller 703 corresponds to the controller 300 illustrated in FIG. 3.

The image processing unit 704 is a functional unit that processes an image. The image processing unit 704 of the present exemplary embodiments corresponds to at least one of the image forming device 200 that forms an image and the image reading device 100 that reads an image of an original document.

Thus, the processing conditions referred to here mean the processing conditions for image processing performed by either or both of the image forming device 200 and the image reading device 100. Specifically, the processing conditions includes at least one of the following (a) to (c): (a) conditions for forming an image with the image forming device 200; (b) conditions for reading an image with the image reading device 100; and (c) conditions for outputting information of an image read by the image reading device 100 to an external device. In this case, the outputting of information of the read image to the external device corresponds to transmission by facsimile.

In the present exemplary embodiments, image information (image data) for forming an image with the image processing unit 704 is received not by the NFC connection unit 702 but by the Wi-Fi connection unit 701. The reason for this is that a communication speed of the Wi-Fi Direct connection is generally higher than that of the NFC connection, and accordingly, the image information is transmitted at a higher speed with the Wi-Fi Direct connection than that with the NFC connection when transmitting data such as image information, the data size of which tends to be increased. In contrast, it is unlikely that a problem arises when the NFC connection is used to transmit the processing conditions, the data sizes of which are generally small.

The display unit 705 is a functional unit that displays the processing conditions for processing an image.

The input unit 706 is a functional unit that allows the user to input a reception instruction, which causes the NFC connection unit 702 to become ready for receiving the information related to the processing conditions.

In the present exemplary embodiments, when the user input the reception instruction with the input unit 706, the image processing apparatus-side controller 703 may cause the image processing apparatus 2 to become ready for accepting the information related the processing conditions from the one mobile terminal 3. This reception instruction may be input by, for example, pressing a button provided in the image processing apparatus 2. When the user in front of the image processing apparatus 2 presses this button, the image processing apparatus 2 becomes ready for accepting the information related to the processing conditions of the mobile terminal 3. Thus, the user in front of the image processing apparatus 2 explicitly changes the state of the image processing apparatus 2 to that ready for accepting the processing conditions from the mobile terminal 3. After that, the user transmits the processing conditions from his or her mobile terminal 3. After these processing conditions have been received, the image processing apparatus-side controller 703 inhibits the reception of the processing conditions from the other mobile terminals 3. That is, with the above-described configuration, a function that sets the following state may be implemented: that is, the information related to the processing conditions is accepted with the NFC connection unit 702 from the one mobile terminal 3, which performs wireless communication, and is not accepted from the other mobile terminals 3, which perform wireless communication, other than the one mobile terminal 3.

The input of the reception instruction is not necessarily performed. For example, the image processing apparatus-side controller 703 may set a state in which the information related to the processing conditions from any of the other mobile terminals 3 is not accepted when the NFC connection unit 702 receives the information related to the processing conditions from the one mobile terminal 3. That is, when the user transmits the processing conditions from his or her mobile terminal 3 via the NFC connection, acceptance of the information related to the processing conditions from the other mobile terminals 3 is inhibited.

Furthermore, the input unit 706 allows the user to input a performance instruction for performing image processing. That is, when the user inputs the performance instruction, image processing is started in accordance with the processing conditions set by the user with the mobile terminal 3. In the case where the user does not input the performance instruction within a predetermined time period, the image processing apparatus-side controller 703 releases the state, in which the information related to the processing conditions from the other mobile terminals 3 is not accepted.

The display unit 705 and the input unit 706 correspond to the UI 400 illustrated in FIG. 2. That is, the UI 400 uses a touch panel in the present exemplary embodiments and displays the processing conditions therein.

The UI 400, which uses the touch panel, displays buttons for inputting the reception instruction and the performance instruction in the touch panel. Thus, the user may input the reception instruction and the performance instruction by touching these buttons. The buttons are not limited to those displayed in the touch panel. The separately prepared ordinary buttons having switch mechanisms may be used. The button for inputting the performance instruction may be regarded as a start button.

The Wi-Fi connection unit 801 is a functional unit that performs communication via the Wi-Fi Direct connection on the mobile terminal 3 side. The Wi-Fi connection unit 801 corresponds to the wireless I/F F3b illustrated in FIG. 4B.

The NFC connection unit 802 is a functional unit that performs communication via the NFC connection on the mobile terminal 3 side. The NFC connection unit 802 corresponds to the NFC I/F F3c illustrated in FIG. 4B.

The mobile terminal-side controller 803 controls the Wi-Fi connection unit 801 and the NFC connection unit 802. The mobile terminal-side controller 803 corresponds to the CPU, the RAM, and the ROM in the mobile terminal 3.

The display unit 804 is a functional unit that displays information such as contents as an image in the mobile terminal 3 and corresponds to the liquid crystal panel 3a illustrated in FIG. 4A.

Description of Operations of Image Processing Apparatus 2 and Mobile Terminal 3

Next, operations of the image processing apparatus 2 and the mobile terminal 3 are described.

First Exemplary Embodiment

Initially, a first exemplary embodiment is described.

Figure 6:
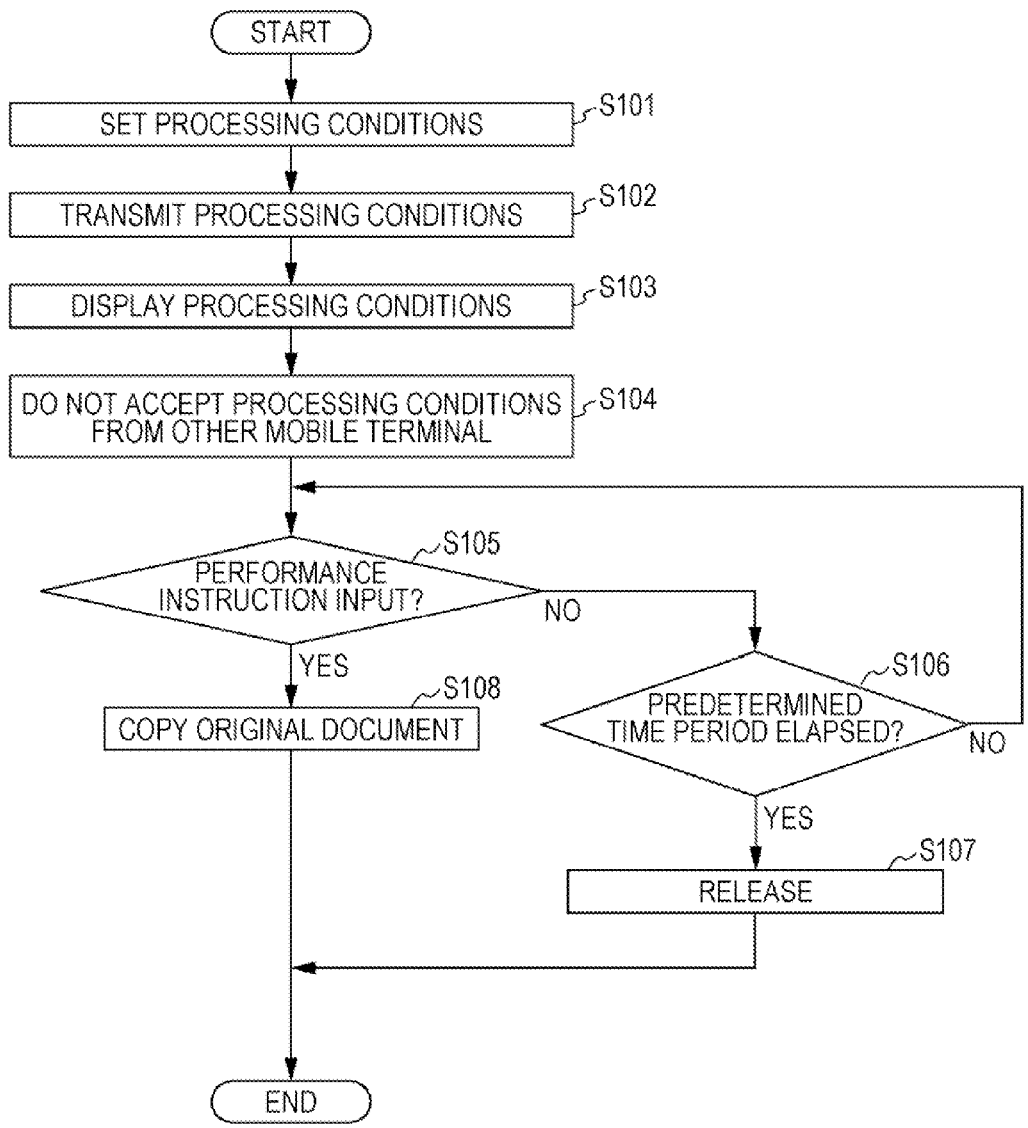
FIG. 6 is a flowchart illustrating operations of the image processing apparatus and the mobile terminal according to a first exemplary embodiment.

FIG. 6 is a flowchart illustrating the operations of the image processing apparatus 2 and the mobile terminal 3 according to the first exemplary embodiment. FIGS. 7A to 7D illustrate examples of screens displayed in the liquid crystal panel 3a of the mobile terminal 3 during the operations illustrated in FIG. 6. FIGS. 8A to 8E illustrate examples of screens displayed in the UI 400 of the image processing apparatus 2 during the operations illustrated in FIG. 6.

The operations of the image processing apparatus 2 and the mobile terminal 3 are described below with reference to FIGS. 5 to 8E. Here, a case, in which the user copies an original document with the image processing apparatus 2 and the mobile terminal 3, is described as an example.

Initially, the user operates the mobile terminal 3 to set the processing conditions for copying the original document with the image processing apparatus 2 (step S101). The user operates while checking the screen displayed in the display unit 804 of the mobile terminal 3.

Figure 7A:
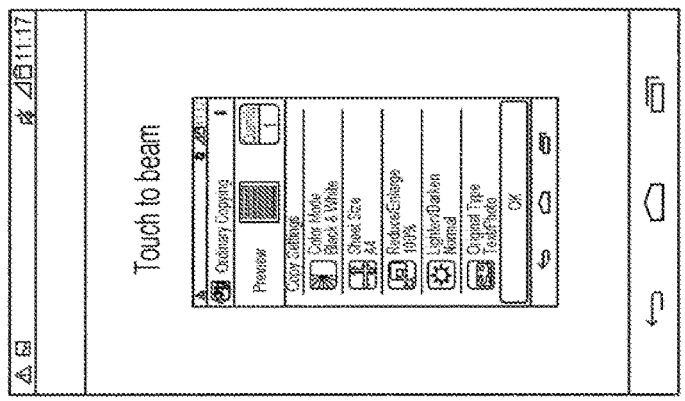
FIGS. 7A to 7D illustrate examples of screens displayed in a liquid crystal panel of the mobile terminal during the operations illustrated in FIG. 6.

Actually, the user starts up an application program for setting these processing conditions in the mobile terminal 3, and uses the application program to set the processing conditions. Specifically, when the application program for setting the processing conditions is started up, the screen illustrated in FIG. 7A is displayed in the liquid crystal panel 3a. This screen allows the user to select a function to be performed by the image processing apparatus 2. In this case, the user taps "Copy" to select the copying function.

Figure 7B:
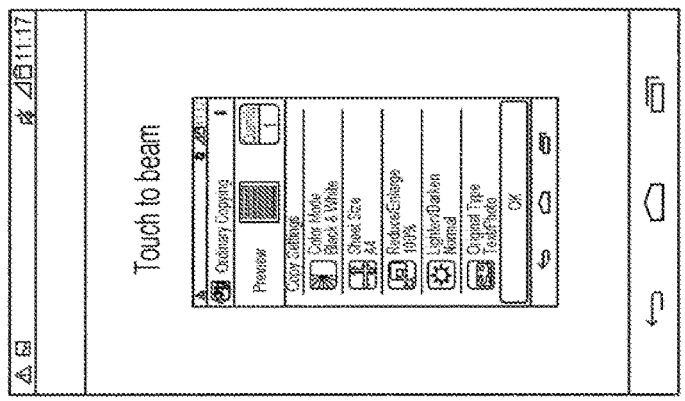

FIG. 7B illustrates the screen displayed in the liquid crystal panel 3a after the "Copy" has been tapped. This screen allows the user to select a type of the original document to be copied. In this screen, the user may select the type of copy from among "Ordinary Copying (one sided copying)", "License/Business Card Copying", "2 Sided Copying", "2 Pages UP (2-pages-in-1-sheet)", and "Poster Copying". Here, the user taps the "Ordinary Copying".

Figure 7C:
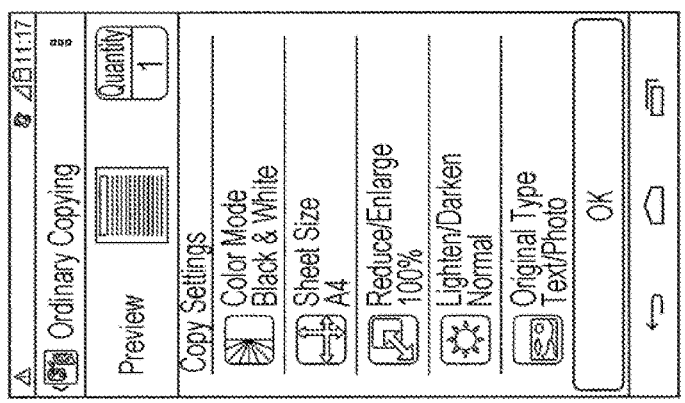

In this case, the screen switches to that illustrated in FIG. 7C. In the screen illustrated in FIG. 7C, various conditions for copying are displayed. Here, the color mode, the sheet size, the ratio of reduction/enlargement, the copy density, the image quality of the original document may be set. The user sets "Black & White" as the color mode, "A4" as the sheet size, "100%" as the ratio of reduction/enlargement, "Normal" as the copy density and "Text/Photo" as the image quality of the original document.

Thus, the processing conditions for copying with the image processing apparatus 2 may be set with the mobile terminal 3.

Figure 7D:
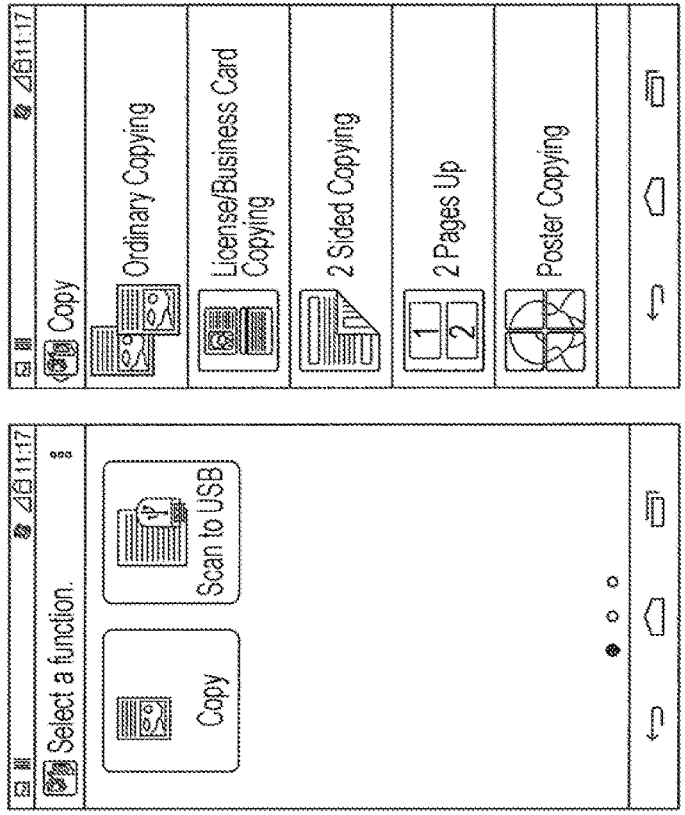

Then, when the user taps an "OK" button while the screen illustrated in FIG. 7C is displayed, the screen switches to that illustrated in FIG. 7D. The screen illustrated in FIG. 7D is a standby screen for transmitting the processing conditions to the image processing apparatus 2 via the NFC connection.

Referring back to FIG. 6, the user transmits the processing conditions from the mobile terminal 3 to the image processing apparatus 2 via the NFC connection (step S102). That is, the NFC connection unit 802 of the mobile terminal 3 and the NFC connection unit 702 of the image processing apparatus 2 are automatically connected via the NFC connection, and the processing conditions are transmitted from the mobile terminal 3 to the image processing apparatus 2. The processing conditions are transmitted by utilizing, for example, an NFC data exchange format (NDEF).

Actually, the user holds the mobile terminal 3 over the NFC I/F 600 of the image processing apparatus 2 while the screen illustrated in FIG. 7D is displayed. When the user taps any position on the screen, the processing conditions are transmitted from the NFC I/F F3c of the mobile terminal 3 to the NFC I/F 600 of the image processing apparatus 2.

When the NFC connection unit 702 receives the processing conditions on the image processing apparatus 2 side, the image processing apparatus-side controller 703 switches the screen displayed in the display unit 705 to a screen displaying the processing conditions (step S103). The user checks the processing conditions in this screen. This screen may be configured to allow the user to input a change in the processing conditions through the input unit 706 so as to change the processing conditions.

The image processing apparatus-side controller 703 sets the state in which the information related to the processing conditions from any of the other mobile terminals 3 is not accepted when the processing conditions is received from the NFC connection unit 702 (step S104).

Next, the image processing apparatus-side controller 703 determines whether or not the performance instruction has been input from the input unit 706 (step S105).

If the performance instruction has not been input from the input unit 706 (NO in step S105), the image processing apparatus-side controller 703 determines whether or not a time period equal to or more than a predetermined time period has been elapsed from the reception of the processing conditions from the NFC connection unit 702 (step S106). If the time period having been elapsed is equal to or more than the predetermined time period (YES in step S106), the image processing apparatus-side controller 703 releases the state, in which the information related to the processing conditions from the other mobile terminals 3 is not accepted (step 107). If the time period having been elapsed is less than the predetermined time period (NO in step S106), the processing returns to step S105.

When the user sets the original document and inputs the performance instruction with the input unit 706 (YES in step S105), the original document is copied by the image processing unit 704 (step S108).

Figure 8A:
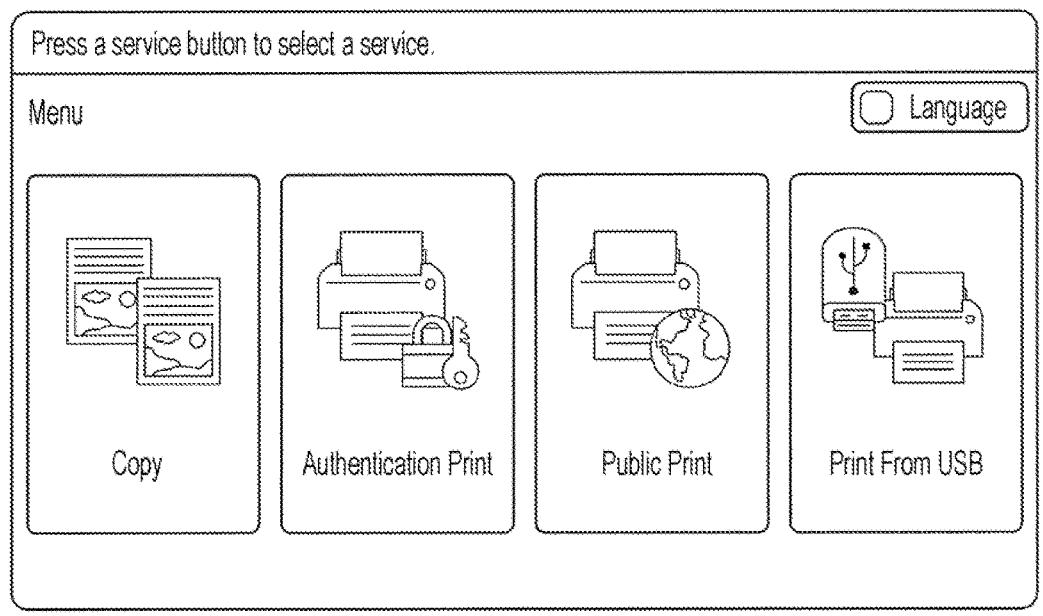
FIGS. 8A to 8E illustrate examples of screens displayed in a user interface of the image processing apparatus during the operations illustrated in FIG. 6.

Actually, in the image processing apparatus 2, the screen illustrated in FIG. 8A, which is a standby screen for operation, is initially displayed in the UI 400. In this state, when the NFC I/F 600 receives the processing conditions from the mobile terminal 3, the screen switches to that illustrated in FIG. 8B.

Figure 8B:
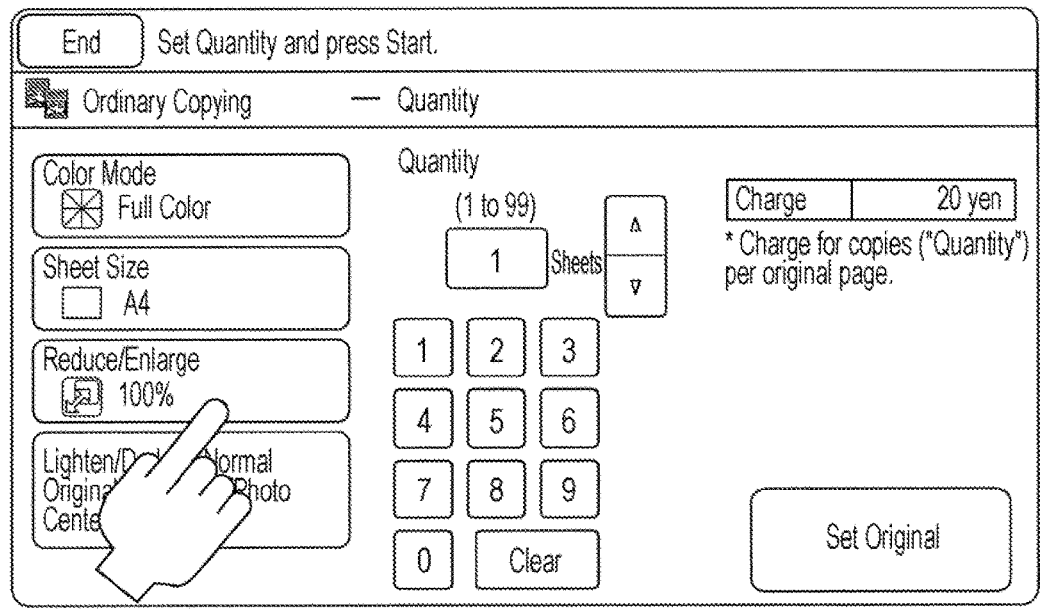

The screen illustrated in FIG. 8B displays the processing conditions. That is, the screen similar to those illustrated in FIG. 7C described above is displayed in the UI 400. The user checks the processing conditions displayed in the UI 400, and when the user wishes to change the processing conditions, the user may touch the UI 400 to input different processing conditions, to which the user wishes to change the displayed processing conditions. The changed processing conditions are reflected in the display of the UI 400. In this state, even when any of the other mobile terminals 3 is held over the NFC I/F 600 of the image processing apparatus 2, a change in the processing conditions is not accepted.

Figure 8C:
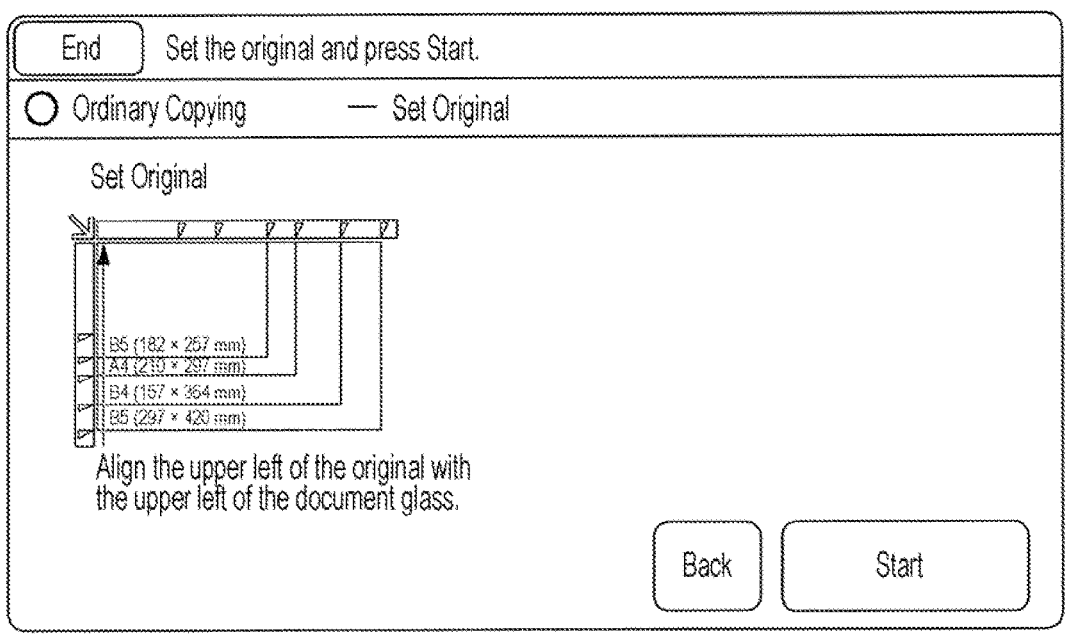
Figure 8D:
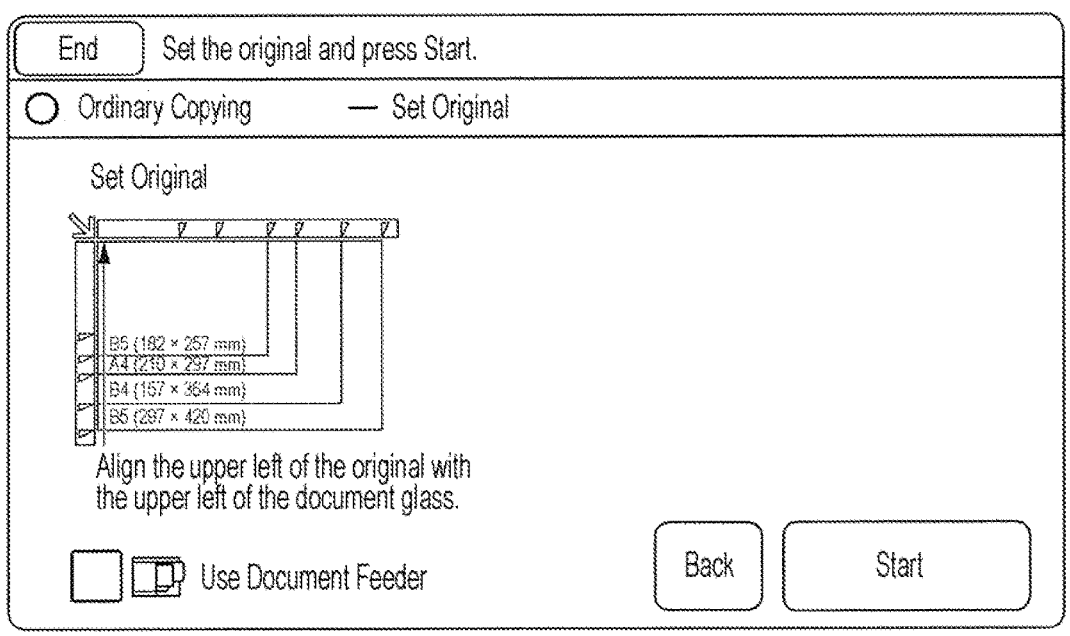

In the present exemplary embodiment, the screen displayed in the UI 400 may be changed to that as illustrated in FIG. 8C or 8D by touching a "Set Original" button in the screen illustrated in FIG. 8B.

Out of FIGS. 8C and 8D, FIG. 8C is a screen that describes a method of setting the original document on the platen glass 111 of the image reading unit 110 (see FIG. 3). As illustrated in FIG. 8C, the relationships between the sheet sizes and the positions where the original document is set on the platen glass 111 are described with illustration.

FIG. 8D is a screen that describes a method of setting the original document when the document transport device 120 (see FIG. 3, ADF) may be used. Referring to FIG. 8D, when "Use Document Feeder" is not checked, the screen similar to those illustrated in FIG. 8C is displayed in the UI 400. When the user checks the "Use Document Feeder", the screen switches to that illustrated in FIG. 8E, and description of a method of setting the original document on the ADF appears.

Figure 8E:
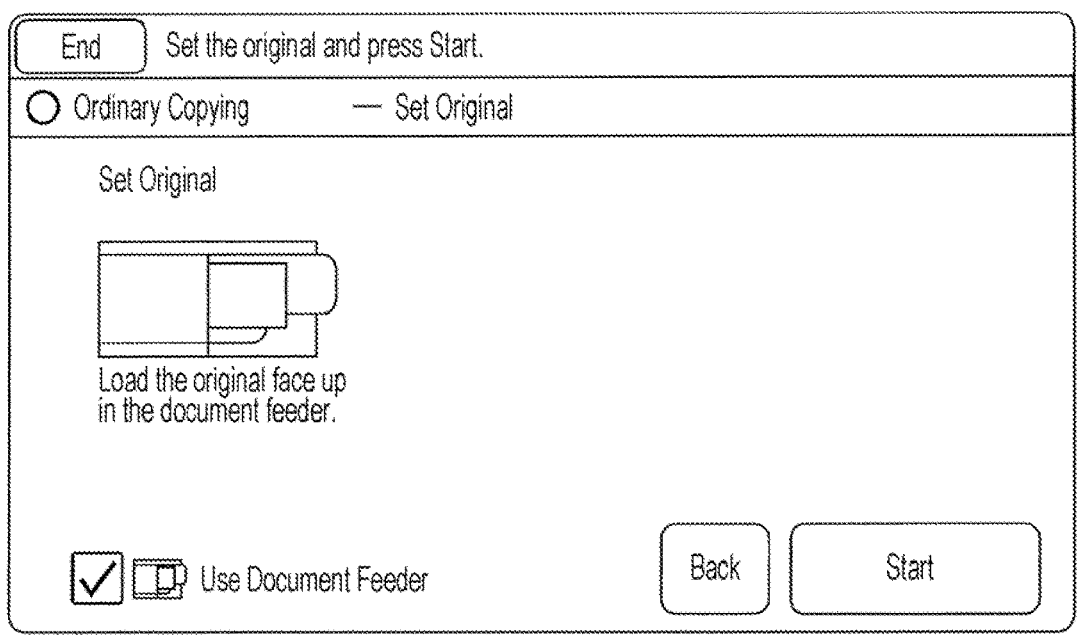

When the user sets the original document in accordance with the instructions represented in FIGS. 8C to 8E and presses the start button, copying of the original document is performed. However, when the start button is not pressed within the predetermined time period, the processing conditions are cleared and the screen returns to that illustrated in FIG. 8A.

Second Exemplary Embodiment

Next, a second exemplary embodiment is described.

FIG. 9 is a flowchart illustrating the operations of the image processing apparatus 2 and the mobile terminal 3 according to the second exemplary embodiment. FIGS. 10A to 10F illustrate examples of screens displayed in the liquid crystal panel 3a of the mobile terminal 3 during the operations illustrated in FIG. 9. FIGS. 11A to 11F illustrate examples of screens displayed in the UI 400 of the image processing apparatus 2 during the operations illustrated in FIG. 9.

The operations of the image processing apparatus 2 and the mobile terminal 3 are described below with reference to FIGS. 9 to 11F. Also in the description below, a case, in which the user copies an original document with the image processing apparatus 2 and the mobile terminal 3, is described as an example.

Step S201 illustrated in FIG. 9 is similar to step S101 illustrated in FIG. 6. Also, the screens illustrated in FIGS. 10A to 10C, which are displayed in the liquid crystal panel 3a of the mobile terminal 3 at this time, are similar to those illustrated in FIGS. 7A to 7C.

Figure 10D:
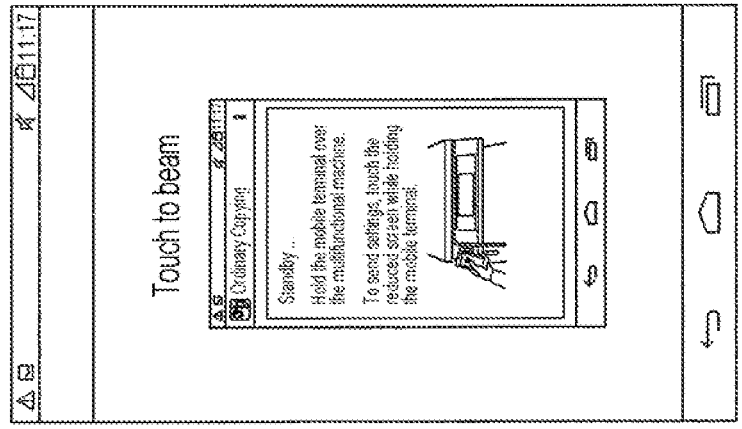

According to the present exemplary embodiment, when the user taps an "OK" button while the screen illustrated in FIG. 10C is displayed, the screen switches to that illustrated in FIG. 10D. The screen illustrated in FIG. 10D prompts the user to press an "Accept from Mobile" button, which will be described later, in the image processing apparatus 2.

Figure 10E:
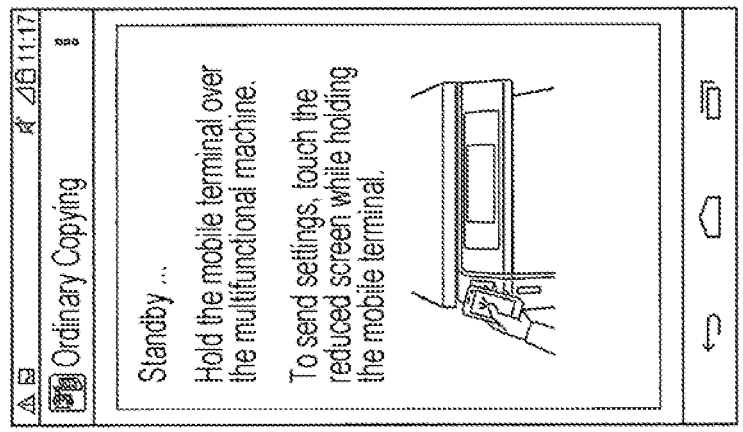
Figure 10F:
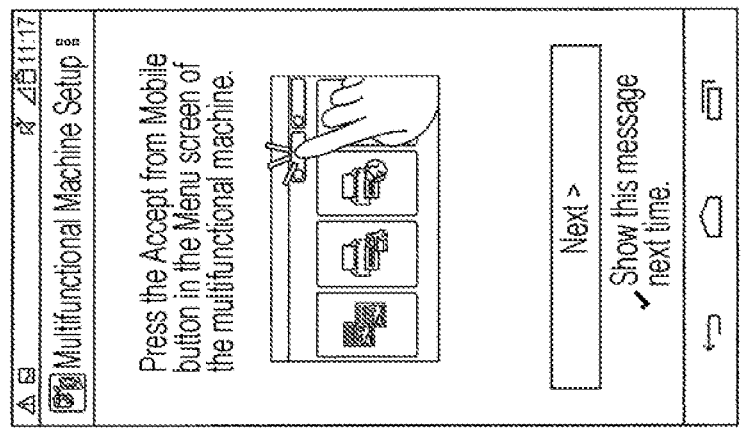

Then, when the "Next" is touched in the screen illustrated in FIG. 10D, the screen switches to that illustrated in FIG. 10E. The screen illustrated in FIG. 10E prompts the user to hold the mobile terminal 3 over the NFC I/F 600 of the image processing apparatus 2 and is followed by the screen illustrated in FIG. 10F. The screen illustrated in FIG. 10F is a standby screen for transmitting the processing conditions to the image processing apparatus 2 via the NFC connection.

Referring back to FIG. 9, on the image processing apparatus 2 side, the input unit 706 accepts input of the reception instruction by the user (step S202).

Figure 11A:
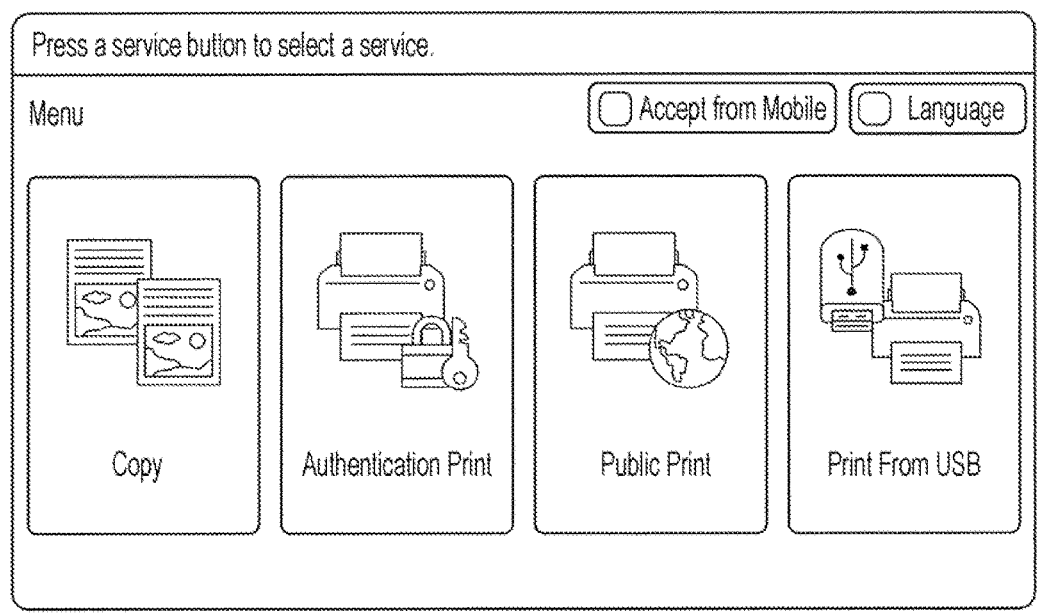
FIGS. 11A to 11F illustrate examples of screens displayed in the user interface of the image processing apparatus during the operations illustrated in FIG. 9.

Actually, in the image processing apparatus 2, the screen illustrated in FIG. 11A, which is a standby screen for operation, is initially displayed in the UI 400. In this state, when the "Accept from Mobile" button is touched, the screen switches to that illustrated in FIG. 11B. Touching the "Accept from Mobile" button as described above corresponds to the input of the reception instruction by the user.

Figure 11B:
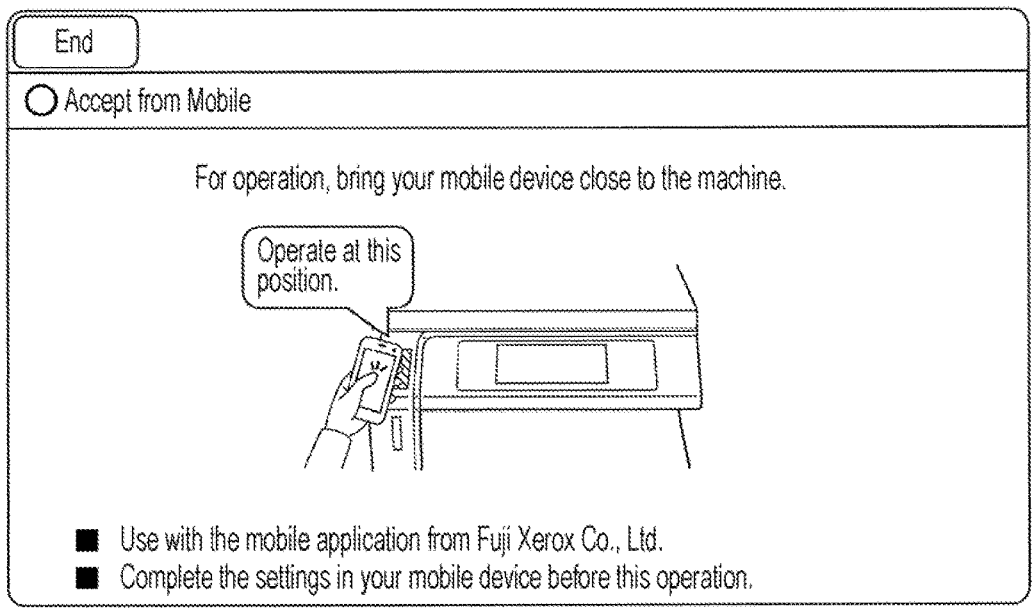
Figure 11C:
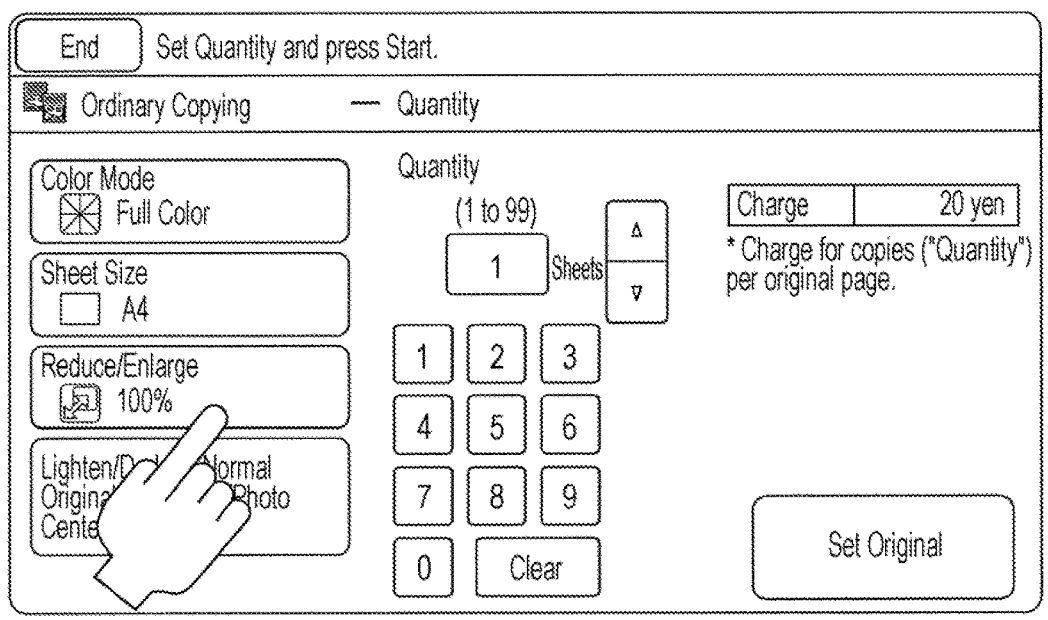
Figure 11D:
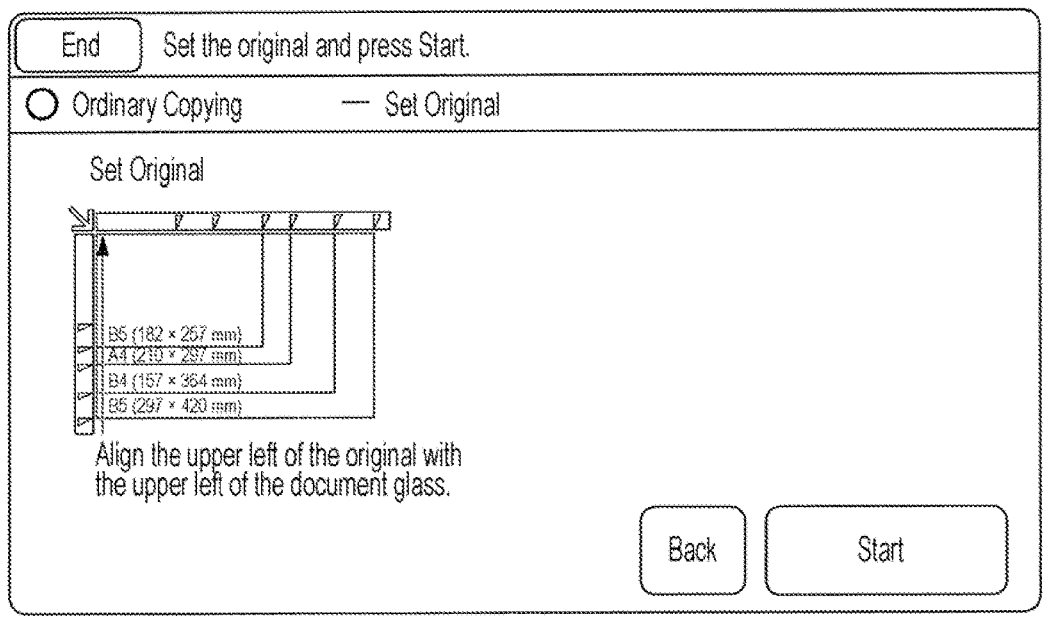
Figure 11E:
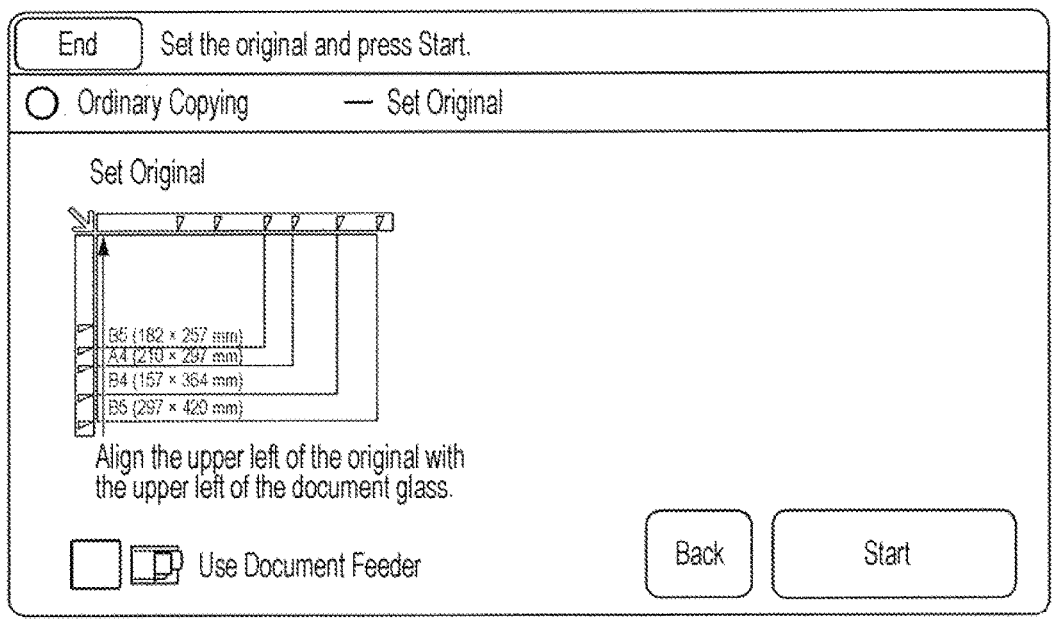
Figure 11F:
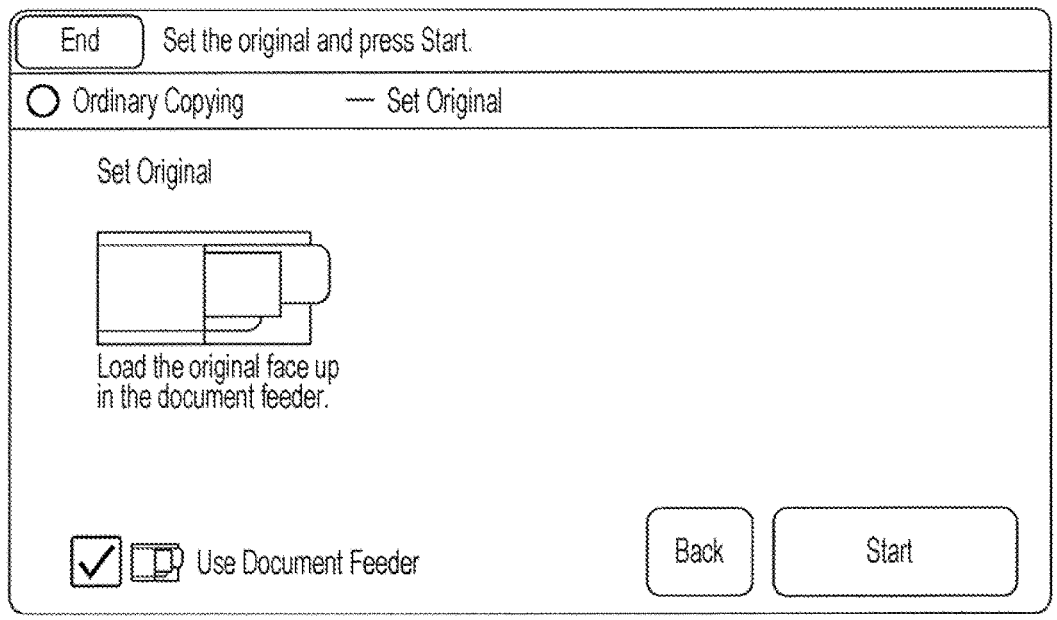

The screen illustrated in FIG. 11B is a standby screen for receiving the processing conditions from the mobile terminal 3 via the NFC connection.

The next step S203 is similar to step S102 illustrated in FIG. 6.

Actually, when the mobile terminal 3 is held over the NFC I/F 600 of the image processing apparatus 2 and any position on the screen of the mobile terminal 3 is tapped while the screen illustrated in FIGS. 10F and 11B is displayed, the processing conditions are transmitted from the NFC I/F F3c of the mobile terminal 3 to the NFC I/F 600 of the image processing apparatus 2. After that, even when any of the other mobiles terminal 3 is held over the NFC I/F 600 of the image processing apparatus 2, a change in the processing conditions is not accepted.

After that, steps 204 to 209 are performed similarly to steps 103 to 108. FIGS. 11C to 11F, which illustrate the screens displayed in the UI 400 in these steps, are similar to FIGS. 8B to 8E.

According to the example having been described in detail above, after the processing conditions have been transmitted from the mobile terminal 3 to the image processing apparatus 2 via the NFC connection, the processing conditions are not accepted from any of the other mobile terminals 3. Thus, even when, for example, the user leaves the proximity of the image processing apparatus 2, the likelihood of changing of the processing conditions by a different user is reduced. This may suppress processing of an image under processing conditions that are not intended by the user, thereby improving convenience for the user. In the case where the user does not input the performance instruction within a predetermined time period, the state, in which the information related to the processing conditions from the other mobile terminals 3 is not accepted, is released. Thus, when the user changes his or her mind and does not wish to perform image processing, transmission of the processing conditions by a different user is permitted.

In the related art, requests for image processing and the like are usually accepted with minimum restrictions, and there are few cases where acceptance of the processing conditions is restricted. In contrast, in the present exemplary embodiments, acceptance of the processing conditions is restricted, thereby improving convenience for the user.

Although the communication unit of the image processing apparatus 2 is the NFC connection unit 702 that performs NFC communication in the above-described example, the communication unit is not limited to this. For example, the mobile terminal 3 and the image processing apparatus 2 may communicate with each other via infrared connection or Bluetooth (trade mark) connection so as to transmit and receive the processing conditions.

In FIGS. 6 to 11F, the image processing apparatus 2 and the mobile terminal 3 are used to copy the original document. Of course, the image processing apparatus 2 and the mobile terminal 3 may also be applied to printing, scanning, and facsimile transmission.

Furthermore, although the image forming device 200 uses an electrophotographic system in the above-described example, the image forming device 200 may use an ink jet method.

In the above-described example, information related to the processing conditions for image processing is received via the wireless communication by the NFC connection unit 702 on the image processing apparatus 2 side. However, the reception of the information related to the processing conditions on the image processing apparatus 2 side is not limited to this. For example, the information related to the processing conditions may be transmitted from the operation terminals 4 and the administrative server 5 in FIG. 1 and so forth through the network 6 or the like via wire communication and received by a wire communication I/F or the like of the image processing apparatus 2. In this case, the wire communication I/F functions as the communication unit.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents. Obviously, from the description in the following claims, changed or modified forms of the foregoing exemplary embodiments are included in the technical scope of the present invention.

What is claimed is:

1. An image processing apparatus comprising:
   a wireless communication interface that receives information related to a processing condition for image processing stored in and specified with a terminal device, the processing condition being a user setting set by a particular user;
   a controller that sets a state in which the information related to the processing condition is accepted with the wireless communication interface from one terminal device, which performs wireless communication, and not from another terminal device, which performs wireless communication, other than the one terminal device;
   a processor with memory having instructions to cause the processor to execute an image processing unit that performs the image processing; and
   a user interface that allows a user to input a performance instruction for performing the image processing,
   wherein when the another terminal device is held over the image processing apparatus, a change in the processing condition is not accepted,
   wherein, when the information related to the processing condition from the one terminal device is received with the wireless communication interface, the controller sets a state in which the information related to the processing condition is not accepted from the other terminal device,
   wherein, when the user does not input the performance instruction within a predetermined time period, the controller releases the state in which the information related to the processing condition is not accepted from the other terminal device,
   wherein the processing condition includes at least one of conditions for forming an image with an image forming device, conditions for reading an image with an image reading device, and conditions for outputting information of an image read by the image reading device to an external device, and
   wherein, when the user taps any position on a screen of the one terminal device, the processing condition is transmitted from the one terminal device to the image processing apparatus.

2. The image processing apparatus according to claim 1, further comprising:
   a user interface that allows a user to input a reception instruction, which causes the wireless communication interface to become ready for receiving the information related to the processing condition,
   wherein, when the user inputs the reception instruction, the controller sets a state in which the information related to the processing condition is accepted from the one terminal device.

3. An image processing system comprising:
   an image processing apparatus that performs image processing; and
   terminal devices with each of which a processing condition for the image processing performed by the image processing apparatus is created, the terminal devices each transmitting the processing condition to the image processing apparatus, the processing condition being a user setting set by a user,
   wherein the image processing apparatus includes
      a wireless communication interface that receives information related to the processing condition,
      a controller that sets a state in which the information related to the processing condition is accepted with the wireless communication interface from one terminal device of the terminal devices which performs wireless communication, and not from another terminal device, which performs wireless communication, other than the one terminal device,
      a processor with memory having instructions to cause the processor to execute an image processing unit that performs the image processing, and
      a user interface that allows a user to input a performance instruction for performing the image processing,
   wherein when the another terminal device is held over the image processing apparatus, a change in the processing condition is not accepted, wherein, when the information related to the processing condition from the one terminal device is received with the wireless communication interface, the controller sets a state in which the information related to the processing condition is not accepted from the other terminal device, wherein, when the user does not input the performance instruction within a predetermined time period, the controller releases the state in which the information related to the processing condition is not accepted from the other terminal device, wherein the processing condition includes at least one of conditions for forming an image with an image forming device, conditions for reading an image with an image reading device, and conditions for outputting information of an image read by the image reading device to an external device, and wherein, when the user taps any position on a screen of the one terminal device, the processing condition is transmitted from the one terminal device to the image processing apparatus.

4. The image processing system according to claim 3, wherein the wireless communication interface receives the information related to the processing condition via a near field wireless communication.

* * * * *